US012670636B2

(12) United States Patent
Kerr et al.

(10) Patent No.: US 12,670,636 B2
(45) Date of Patent: Jun. 30, 2026

(54) MAPPING COLOR TO DATA FOR DATA BOUND OBJECTS

(71) Applicant: Adobe Inc., San Jose, CA (US)

(72) Inventors: Bernard Kerr, Sausalito, CA (US); Dmytro Baranovskiy, Sydney (AU); Benjamin Farrell, Hayward, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/980,481

(22) Filed: Nov. 3, 2022

(65) Prior Publication Data

US 2024/0153155 A1     May 9, 2024

(51) Int. Cl.
| | |
|---|---|
| *G06T 11/00* | (2006.01) |
| *G06T 11/10* | (2026.01) |
| *G06T 11/20* | (2006.01) |
| *G06T 11/26* | (2026.01) |

(52) U.S. Cl.
CPC .............. *G06T 11/10* (2026.01); *G06T 11/26* (2026.01); *G06T 2200/24* (2013.01)

(58) Field of Classification Search
CPC .. G06T 11/001; G06T 11/206; G06T 2200/24
See application file for complete search history.

(56) References Cited

U.S. PATENT DOCUMENTS

| | | | |
|---|---|---|---|
| 5,226,118 A | 7/1993 | Baker et al. |
| 5,359,724 A | 10/1994 | Earle |
| 5,437,008 A | 7/1995 | Gay et al. |

| | | | |
|---|---|---|---|
| 5,461,708 A | 10/1995 | Kahn |
| 5,581,678 A | 12/1996 | Kahn |
| 5,608,899 A | 3/1997 | Li et al. |
| 5,619,631 A | 4/1997 | Schott |
| 5,990,888 A | 11/1999 | Blades et al. |
| 5,999,192 A | 12/1999 | Selfridge et al. |
| 6,222,540 B1 | 4/2001 | Sacerdoti |
| 6,995,768 B2 | 2/2006 | Jou et al. |
| 7,158,123 B2 | 1/2007 | Myers et al. |
| 7,574,652 B2 | 8/2009 | Lennon et al. |
| 7,644,361 B2 | 1/2010 | Wu et al. |
| 7,788,606 B2 | 8/2010 | Patel et al. |

(Continued)

OTHER PUBLICATIONS

Chroma.js Color Palette Helper, available online at <https://web.archive.org/web/20210420231939/https://vis4.net/palettes/#/9|s|00429d,96ffea,ffffe0|ffffe0,ff005e,93003a|1|1>, Apr. 20, 2021, 1 page.

(Continued)

*Primary Examiner* — Jin Cheng Wang
(74) *Attorney, Agent, or Firm* — Nicholson De Vos Webster & Elliott LLP

(57) ABSTRACT

Embodiments are disclosed for binding colors to data visualizations on a digital canvas. In some embodiments, a method of binding colors to data visualizations includes receiving a data set including data associated with a variable. A chart, including a plurality of graphic objects, is generated based on the variable of the data set and a visual property of the plurality of graphic objects. A data type associated with the variable determined and first colors are assigned to the plurality of graphic objects based on the data type using a color binding. A selection of second colors to be assigned to the plurality of graphic objects is received and the chart is updated using the second colors.

20 Claims, 13 Drawing Sheets

(56) References Cited

U.S. PATENT DOCUMENTS

| | | | |
|---|---|---|---|
| 8,527,909 | B1 | 9/2013 | Mullany |
| 8,581,840 | B2 | 11/2013 | Mudu et al. |
| 8,661,358 | B2 | 2/2014 | Duncker et al. |
| 8,743,122 | B2 | 6/2014 | Riche et al. |
| 8,860,762 | B2 | 10/2014 | Koshi et al. |
| 9,058,365 | B2 | 6/2015 | Baumgaertel et al. |
| 9,134,901 | B2 | 9/2015 | Cragun |
| 9,135,233 | B2 | 9/2015 | Fan et al. |
| 9,158,766 | B2 | 10/2015 | Blyumen |
| 9,202,297 | B1 | 12/2015 | Winters et al. |
| 9,251,548 | B1 | 2/2016 | Garrity et al. |
| 9,323,445 | B2 | 4/2016 | Kritt et al. |
| 9,377,864 | B2 | 6/2016 | Tullis et al. |
| 9,389,777 | B2 | 7/2016 | Sekharan |
| 9,513,792 | B2 | 12/2016 | Koshi et al. |
| 9,558,172 | B2 | 1/2017 | Rampson et al. |
| 9,563,674 | B2 | 2/2017 | Hou et al. |
| 9,569,082 | B1 | 2/2017 | Jin et al. |
| 9,690,449 | B2 | 6/2017 | Morozov et al. |
| 9,760,262 | B2 | 9/2017 | Drucker et al. |
| 9,761,026 | B1 | 9/2017 | Barabas et al. |
| 9,792,017 | B1 | 10/2017 | Landefeld et al. |
| 9,804,726 | B1 | 10/2017 | Joos et al. |
| 9,817,563 | B1 | 11/2017 | Stokes et al. |
| 9,824,470 | B2 | 11/2017 | Kuo |
| 9,892,531 | B2 | 2/2018 | Csenteri et al. |
| 10,049,141 | B2 | 8/2018 | Prophete et al. |
| 10,109,086 | B1 | 10/2018 | Bakshi et al. |
| 10,146,846 | B2 | 12/2018 | Genochio et al. |
| 10,275,305 | B2 | 4/2019 | Venkateswarulu et al. |
| 10,282,360 | B2 | 5/2019 | Krause et al. |
| 10,416,871 | B2 | 9/2019 | Hou et al. |
| 10,423,313 | B2 | 9/2019 | Olsson et al. |
| 10,521,077 | B1 | 12/2019 | Beran |
| 10,685,035 | B2 | 6/2020 | Keahey et al. |
| 10,698,599 | B2 | 6/2020 | D'Angelo et al. |
| 10,732,810 | B1 | 8/2020 | Cohen et al. |
| 10,809,881 | B2 | 10/2020 | Kindelsberger et al. |
| 10,877,984 | B1 | 12/2020 | Martino et al. |
| 11,023,110 | B2 | 6/2021 | Kerr |
| 11,042,558 | B1 * | 6/2021 | Hearst .................. G06F 40/18 |
| 11,270,483 | B1 | 3/2022 | Chilamakuri et al. |
| 11,340,750 | B1 | 5/2022 | Willis et al. |
| 11,625,149 | B2 | 4/2023 | Leyden et al. |
| 12,056,445 | B2 | 8/2024 | Dvorak |
| 2002/0059258 | A1 | 5/2002 | Kirkpatrick |
| 2002/0118192 | A1 | 8/2002 | Couckuyt et al. |
| 2004/0030504 | A1 | 2/2004 | Helt et al. |
| 2004/0085316 | A1 | 5/2004 | Malik |
| 2005/0068320 | A1 | 3/2005 | Jaeger |
| 2005/0108643 | A1 | 5/2005 | Schybergson et al. |
| 2005/0232055 | A1 | 10/2005 | Couckuyt et al. |
| 2006/0103651 | A1 | 5/2006 | Kessler et al. |
| 2007/0060798 | A1 | 3/2007 | Krupnik et al. |
| 2007/0126736 | A1 | 6/2007 | Tolle et al. |
| 2008/0195643 | A1 | 8/2008 | Sheth-Voss et al. |
| 2009/0096812 | A1 | 4/2009 | Boixel et al. |
| 2009/0322755 | A1 | 12/2009 | Holm-Peterson et al. |
| 2010/0005411 | A1 | 1/2010 | Duncker et al. |
| 2010/0308102 | A1 | 12/2010 | Mochizuki |
| 2011/0115814 | A1 | 5/2011 | Heimendinger et al. |
| 2011/0283231 | A1 | 11/2011 | Richstein et al. |
| 2011/0307509 | A1 | 12/2011 | Hsiao et al. |
| 2012/0089902 | A1 | 4/2012 | Sheflin |
| 2012/0166470 | A1 | 6/2012 | Baumgaertel et al. |
| 2012/0254783 | A1 | 10/2012 | Pourshahid et al. |
| 2013/0009963 | A1 | 1/2013 | Albrecht |
| 2013/0080444 | A1 | 3/2013 | Wakefield et al. |
| 2013/0086107 | A1 | 4/2013 | Genochio et al. |
| 2013/0097177 | A1 | 4/2013 | Fan et al. |
| 2013/0145244 | A1 | 6/2013 | Rothschiller et al. |
| 2013/0187926 | A1 | 7/2013 | Silverstein et al. |
| 2013/0229416 | A1 | 9/2013 | Krajec et al. |
| 2013/0232174 | A1 | 9/2013 | Krajec et al. |
| 2013/0249917 | A1 | 9/2013 | Fanning et al. |
| 2013/0275904 | A1 | 10/2013 | Bhaskaran et al. |
| 2014/0053091 | A1 | 2/2014 | Hou et al. |
| 2014/0149947 | A1 | 5/2014 | Blyumen |
| 2014/0267290 | A1 | 9/2014 | Hao et al. |
| 2014/0282184 | A1 | 9/2014 | Dewan et al. |
| 2014/0282276 | A1 | 9/2014 | Drucker et al. |
| 2014/0300603 | A1 | 10/2014 | Greenfield |
| 2015/0015504 | A1 | 1/2015 | Lee et al. |
| 2015/0040047 | A1 | 2/2015 | Baarz et al. |
| 2015/0294275 | A1 | 10/2015 | Richardson et al. |
| 2015/0317807 | A1 | 11/2015 | Bartley et al. |
| 2015/0339032 | A1 | 11/2015 | Bandera et al. |
| 2015/0355835 | A1 | 12/2015 | Tsukahara et al. |
| 2016/0026695 | A1 | 1/2016 | Fan et al. |
| 2016/0027193 | A1 | 1/2016 | Schiffer et al. |
| 2016/0055232 | A1 | 2/2016 | Yang et al. |
| 2016/0055659 | A1 | 2/2016 | Wilson et al. |
| 2016/0062555 | A1 | 3/2016 | Ward et al. |
| 2016/0103872 | A1 | 4/2016 | Prophete et al. |
| 2016/0291845 | A1 | 10/2016 | Lingappa |
| 2016/0307344 | A1 | 10/2016 | Monnier et al. |
| 2016/0314606 | A1 | 10/2016 | Tolle et al. |
| 2016/0350951 | A1 | 12/2016 | Chan et al. |
| 2017/0004638 | A1 | 1/2017 | Csenteri et al. |
| 2017/0039741 | A1 | 2/2017 | Bhatnagar et al. |
| 2017/0053425 | A1 | 2/2017 | Lee |
| 2017/0205998 | A1 | 7/2017 | Jin et al. |
| 2017/0228898 | A1 | 8/2017 | Liu et al. |
| 2017/0236312 | A1 | 8/2017 | Ruble et al. |
| 2017/0300545 | A1 | 10/2017 | Lee et al. |
| 2017/0344236 | A1 | 11/2017 | Drucker et al. |
| 2018/0025073 | A1 | 1/2018 | Singh et al. |
| 2018/0089237 | A1 | 3/2018 | Dunne et al. |
| 2018/0129513 | A1 | 5/2018 | Gloystein et al. |
| 2018/0137667 | A1 | 5/2018 | Kindelsberger et al. |
| 2018/0165844 | A1 | 6/2018 | Kirichenko et al. |
| 2018/0165851 | A1 | 6/2018 | Apte et al. |
| 2018/0174337 | A1 | 6/2018 | Menard et al. |
| 2018/0294046 | A1 | 10/2018 | Kamura et al. |
| 2018/0306839 | A1 | 10/2018 | Donnal et al. |
| 2018/0341392 | A1 | 11/2018 | Zheng et al. |
| 2018/0349516 | A1 | 12/2018 | Dutta et al. |
| 2018/0365303 | A1 | 12/2018 | Prophete et al. |
| 2019/0043228 | A1 | 2/2019 | Bhat et al. |
| 2019/0065036 | A1 | 2/2019 | Drucker et al. |
| 2019/0114054 | A1 * | 4/2019 | Kerr ...................... G06T 11/60 |
| 2019/0114055 | A1 * | 4/2019 | Kerr ...................... G06T 11/206 |
| 2019/0114057 | A1 * | 4/2019 | Kerr ................... G06F 3/04845 |
| 2019/0114308 | A1 | 4/2019 | Hancock |
| 2019/0114817 | A1 * | 4/2019 | Kerr ................... G06F 3/04842 |
| 2019/0311812 | A1 | 10/2019 | Sweeney |
| 2019/0324072 | A1 | 10/2019 | Underwood |
| 2020/0004412 | A1 | 1/2020 | Ahuja et al. |
| 2020/0005509 | A1 | 1/2020 | Gibb et al. |
| 2020/0110394 | A1 * | 4/2020 | Hirata ................... G06Q 10/00 |
| 2020/0393940 | A1 | 12/2020 | Stewart |
| 2021/0081663 | A1 | 3/2021 | Pandit et al. |
| 2021/0256019 | A1 | 8/2021 | Prophete et al. |
| 2022/0004293 | A1 | 1/2022 | Stewart |
| 2022/0027555 | A1 | 1/2022 | Dvorak |
| 2022/0202320 | A1 * | 6/2022 | Diener ................ A61B 5/7435 |
| 2022/0300882 | A1 | 9/2022 | Malik |
| 2022/0405993 | A1 | 12/2022 | Li et al. |
| 2023/0077829 | A1 | 3/2023 | Lee et al. |
| 2023/0230300 | A1 | 7/2023 | Yagi et al. |
| 2023/0305679 | A1 | 9/2023 | Marco et al. |
| 2024/0153170 | A1 | 5/2024 | Kerr et al. |
| 2024/0153171 | A1 | 5/2024 | Kerr et al. |
| 2024/0169615 | A1 | 5/2024 | Chen et al. |
| 2024/0265595 | A1 | 8/2024 | Zhao et al. |

OTHER PUBLICATIONS

Github, "chroma.js", available online at <https://web.archive.org/web/20210322202649/https://gka.github.io/chroma.js/>, Mar. 22, 2021, 24 pages.

(56) References Cited

OTHER PUBLICATIONS

Kennedy Design, Inc., "Divergent Color Scale", available online at <https://www.learnui.design/tools/data-color-picker. html#divergent>, 2023, 3 pages.
Non-Final Office Action, U.S. Appl. No. 17/980,485, Jul. 22, 2024, 25 pages.

* cited by examiner

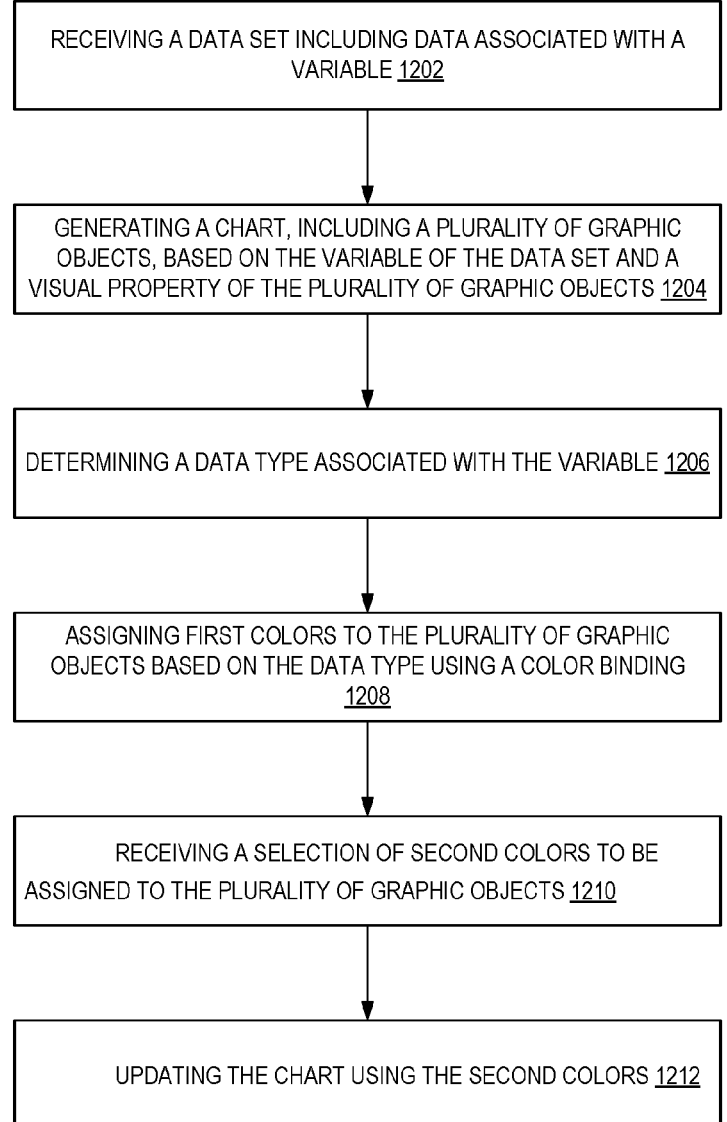

RECEIVING A DATA SET INCLUDING DATA ASSOCIATED WITH A VARIABLE 1202

GENERATING A CHART, INCLUDING A PLURALITY OF GRAPHIC OBJECTS, BASED ON THE VARIABLE OF THE DATA SET AND A VISUAL PROPERTY OF THE PLURALITY OF GRAPHIC OBJECTS 1204

DETERMINING A DATA TYPE ASSOCIATED WITH THE VARIABLE 1206

ASSIGNING FIRST COLORS TO THE PLURALITY OF GRAPHIC OBJECTS BASED ON THE DATA TYPE USING A COLOR BINDING 1208

RECEIVING A SELECTION OF SECOND COLORS TO BE ASSIGNED TO THE PLURALITY OF GRAPHIC OBJECTS 1210

UPDATING THE CHART USING THE SECOND COLORS 1212

*FIG. 12*

MAPPING COLOR TO DATA FOR DATA BOUND OBJECTS

BACKGROUND

Data visualizations, such as charts, graphs, and other visualizations, provide a schematic representation of data that communicates information about the underlying data visually. Creating a data visualization may be a complex and iterative process as it often involves alternating between data manipulation and visual design aspects of the visualization being crafted. Traditional methods of creating data visualizations include using a visualization template, manually drawing the visualization, or writing computer code to build a unique data visualization.

SUMMARY

Introduced here are techniques/technologies for binding color to data visualizations on a digital canvas. A data visualization is created by binding data to a visual property of a graphic object on the digital canvas. Data is treated as another design element, like color, shapes, etc. This means that a designer can add datasets to the digital canvas and use them as part of their drawing by binding a variable from the dataset to a visual property of a graphic object. This binding establishes a relationship between the data in the dataset and the visual property of the graphic object. Additionally, multiple graphic objects can be created automatically corresponding, e.g., to each row of the variable. This automatically creates a data visualization of the data. The designer can add multiple datasets to the canvas and bind different graphic objects to different datasets. This results in multiple data visualizations on the same canvas, bound to different datasets.

Once the data visualizations have been created, color can also be bound to the data. Color can add another dimension to data visualizations by making them more visually appealing or engaging or by enabling the data visualization to convey additional information through color. Because color is treated as another design element, embodiments allow the designer to bind color to data natively, without any manual coding. Embodiments use color bindings to map data values to color values. Different data types may be bound to color differently. For example, categorical data types require a color be assigned to each category, while numerical data types can be represented via multiple colors, gradients, etc. The color bindings capture these relationships between the colors and the underlying dataset and make it easy for the designer to update a data visualization. For example, if the underlying data changes, the binding is updated to map the color data to the new dataset. Likewise, if the selected colors change, the binding is updated to map the new colors to the data.

Additional features and advantages of exemplary embodiments of the present disclosure will be set forth in the description which follows, and in part will be obvious from the description, or may be learned by the practice of such exemplary embodiments. in which:

BRIEF DESCRIPTION OF THE DRAWINGS

The detailed description is described with reference to the accompanying drawings

Figure 7:
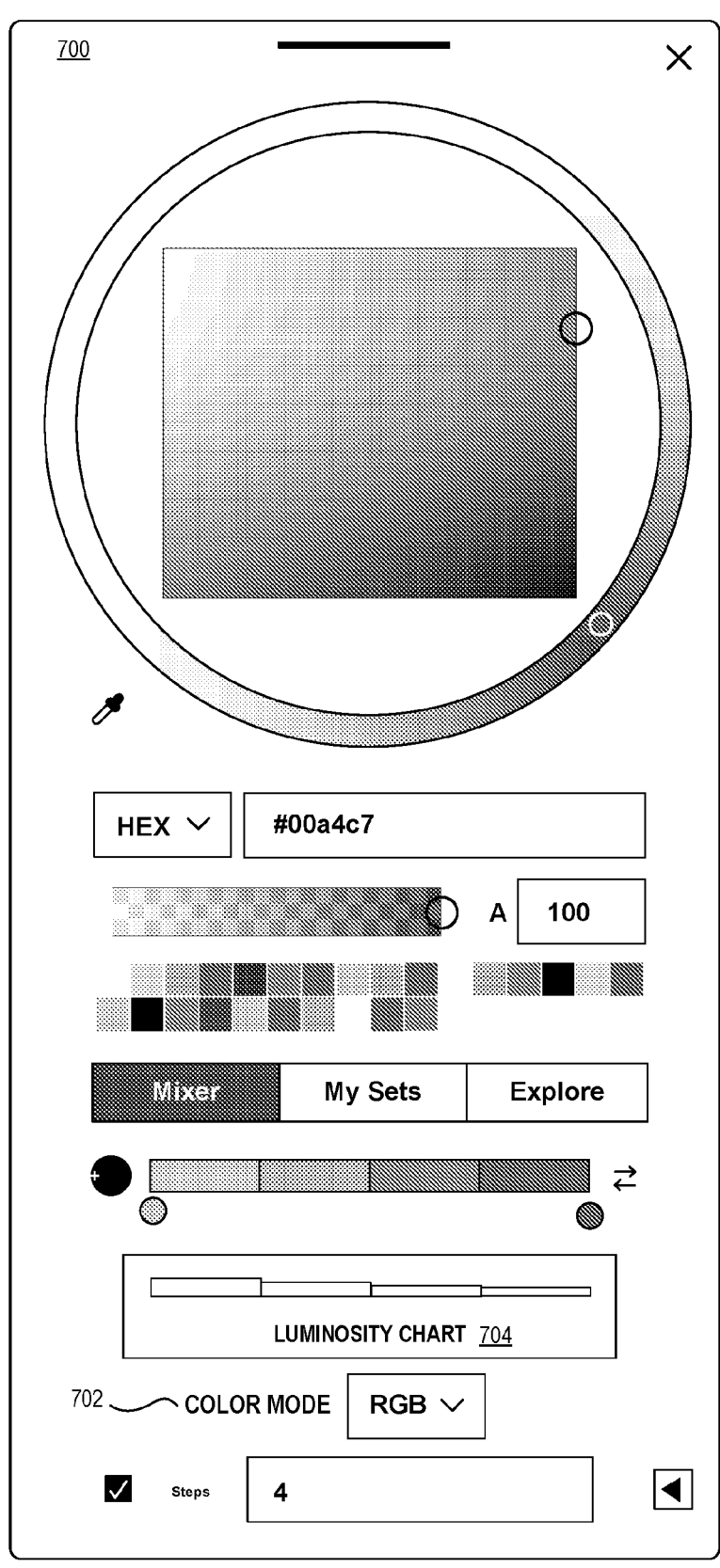

embodiments;

FIG. 7 illustrates a diagram of a color picker in accordance with one or more

Figure 8:
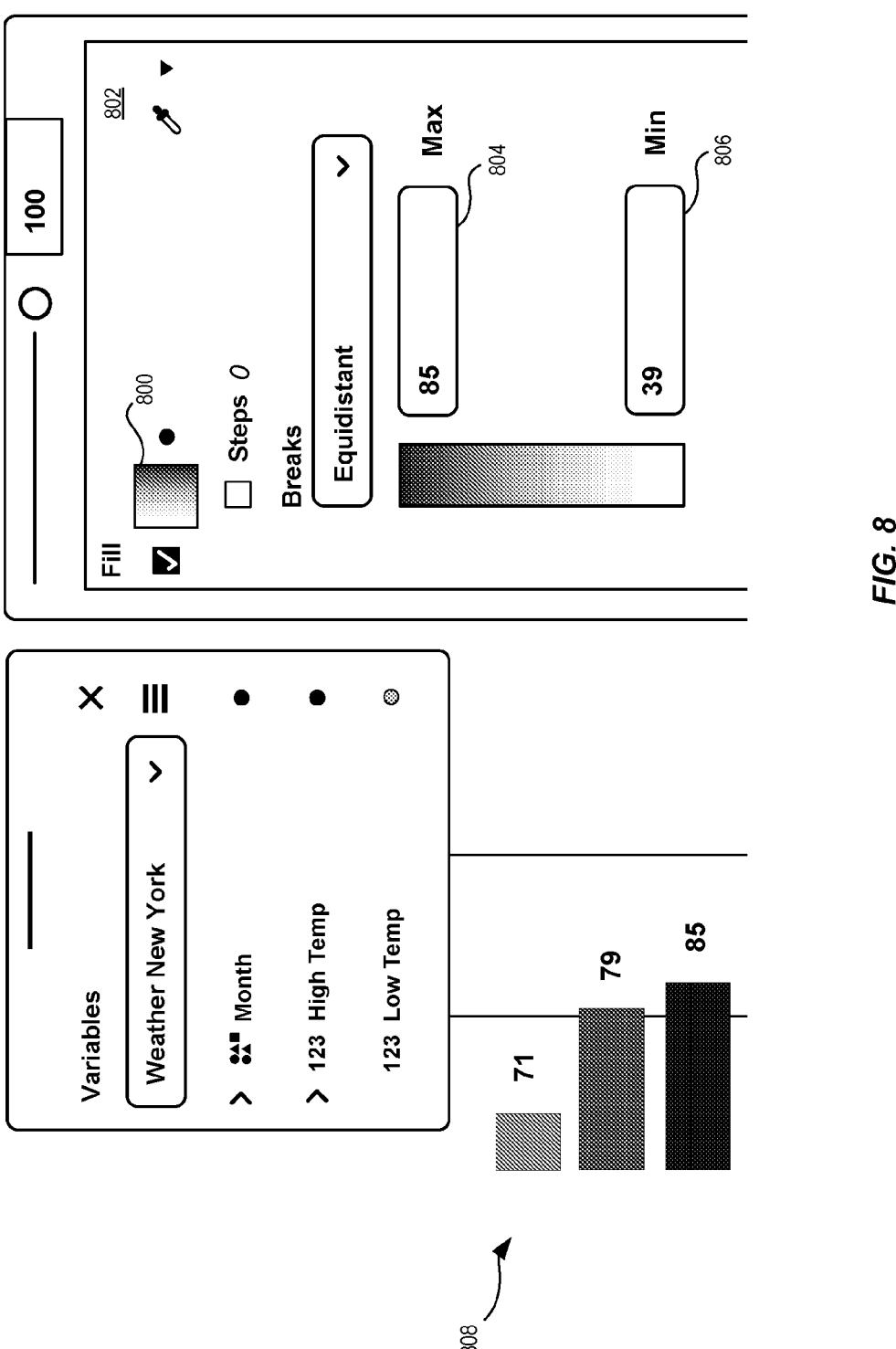
Figure 9:
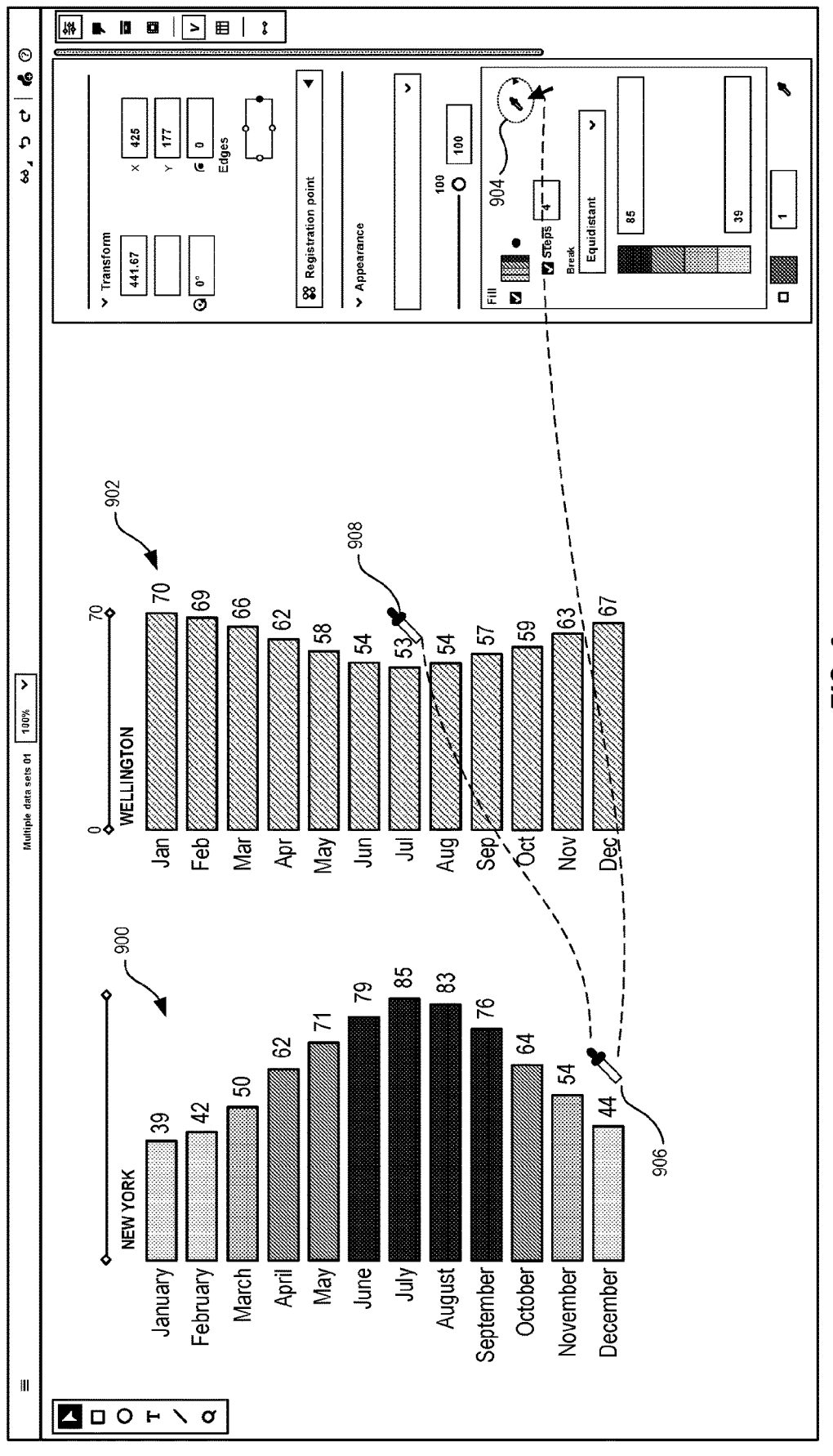
Figure 10:
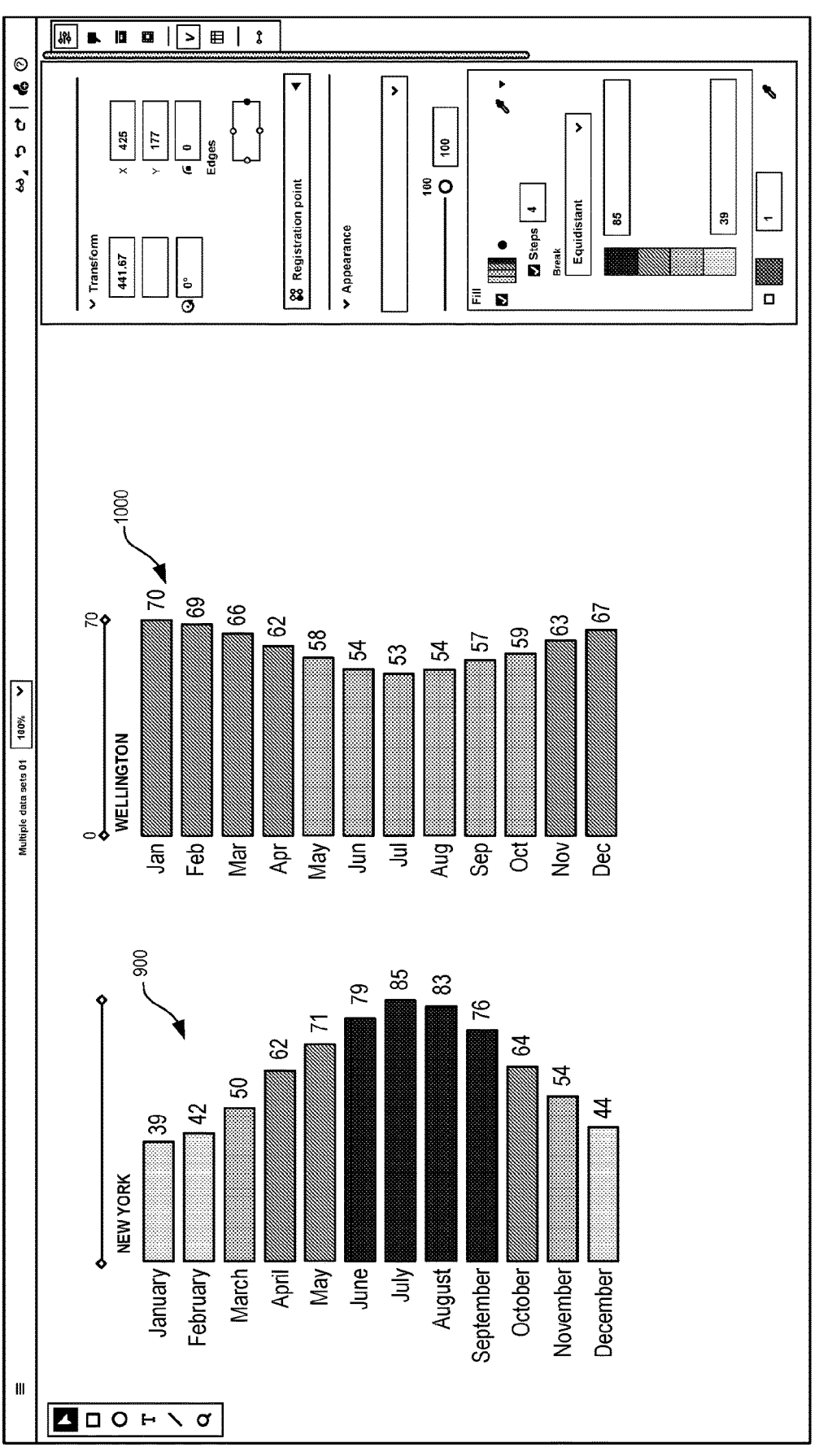
Figure 11:
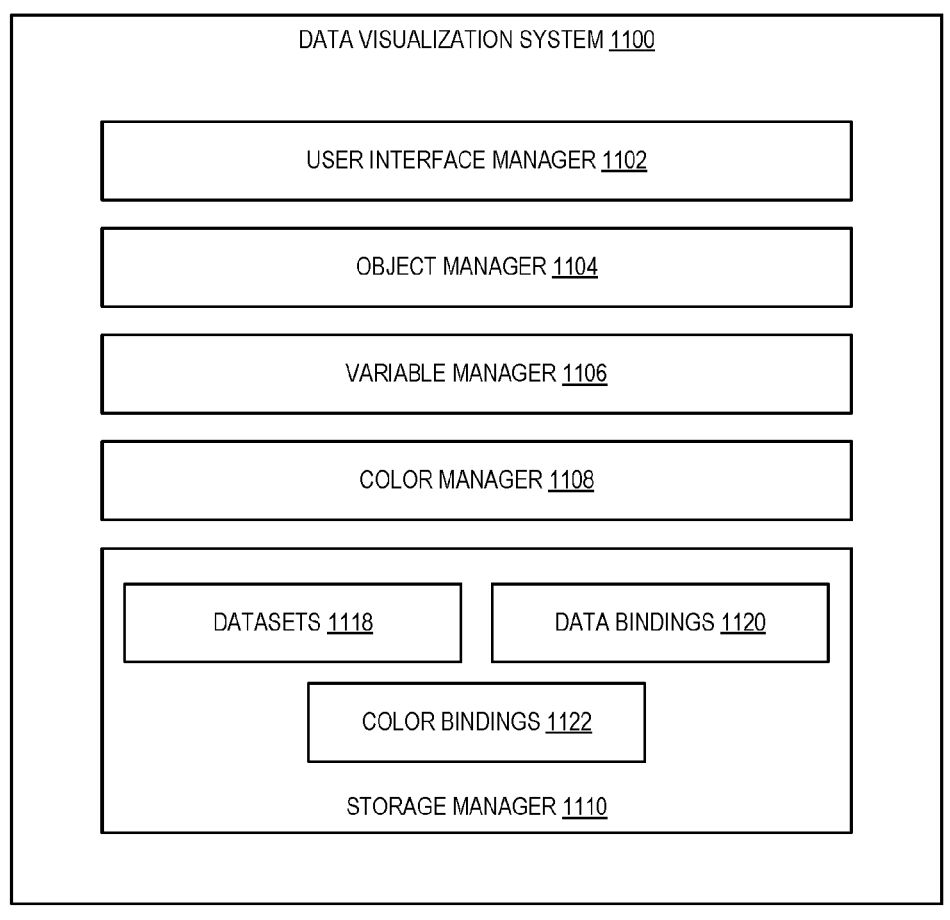
Figure 13:
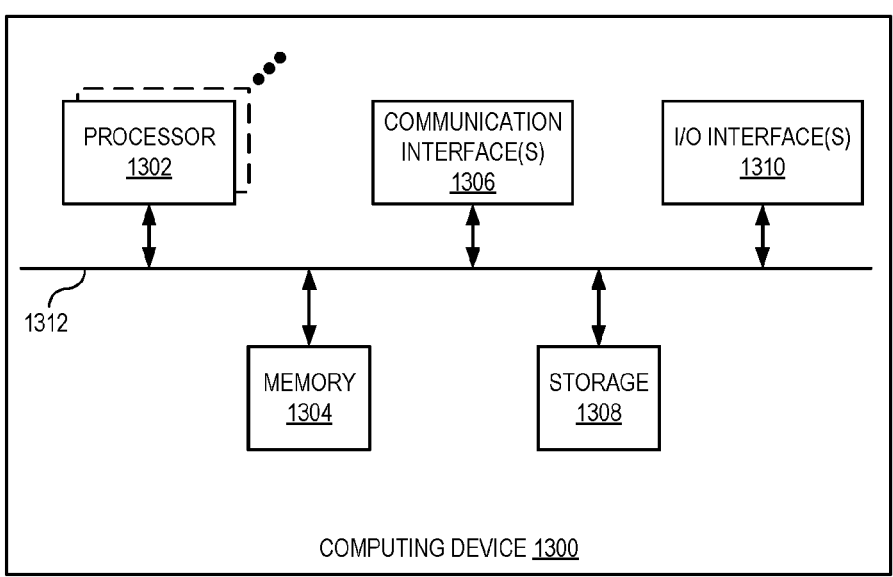

FIG. 8 illustrates a diagram of a user interface panel for choosing fill properties in accordance with one or more embodiments;

FIGS. 9 and 10 illustrate a diagram of a user interface for copying color binding settings from one data visualization to another in accordance with one or more embodiments;

FIG. 11 illustrates a schematic diagram of a data visualization system in accordance with one or more embodiments;

FIG. 12 illustrates a flowchart of a series of acts in a method of managing multiple data visualization bound to different datasets in accordance with one or more embodiments; and FIG. 13 illustrates a block diagram of an exemplary computing device in accordance with one or more embodiments.

DETAILED DESCRIPTION

One or more embodiments of the present disclosure are directed to managing data visualizations bound to different datasets. Data visualizations (e.g., charts, infographics, etc.) are a tool for communicating information about a dataset to viewers. Through data visualizations, information can be clearly and creatively presented. Previously, data visualization techniques were manually implemented. For example, charts and graphs that include various graphic objects were manually drawn to match a dataset. Although this provides maximum creativity, as the data visualization is drawn from scratch by the designer, it is slow and not readily applicable to new charts or datasets. For example, if changes to the underlying dataset were made, or if a new visualization were desired, the previous data visualizations had to be thrown out and new ones created. Alternatively, custom code was written to generate data visualizations from a dataset. Although such code could potentially create new data visualizations from different datasets, it requires significant technical ability, both in programming expertise and data science expertise, to create the code.

Embodiments enable color to be bound to data visualizations created on a digital canvas of a graphic design system. For example, the designer can add a dataset to the digital canvas (e.g., by manually inputting data, linking a file that includes the data, etc.). The data is then parsed and added to a variable panel where the designer can see the names of the datasets, the type of data associated with each dataset, etc. Once added, the data is available to bind to graphic objects on the digital canvas.

A data visualization is created intuitively on the digital canvas by binding data from one of the added datasets to a graphic object on the digital canvas. For example, a designer can sketch one or more graphic objects on a digital canvas, such as drawing shapes, adding text, etc. The visual properties of the new graphic object (e.g., dimensions, position, scale, color, text, etc.) are then available to be bound to data.

In some embodiments, such binding (e.g., associating a visual property of a graphic object with data) can be performed graphically, on the digital canvas. For example, once both a graphic object and a dataset have been added to the digital canvas, the designer can drag a variable from the dataset to a target on the graphic object. When the designer selects the variable (e.g., at the beginning of the drag operation), the available properties of graphic objects on the digital canvas that can be bound to that variable are highlighted with "targets". The available targets may vary depending on the type of data selected (e.g., numerical, categorical, etc.) and the graphic objects on the canvas.

When the data is bound to the visual property of the graphic object, the data visualization is automatically created. For example, each observation in the bound dataset may be used to create a new graphic object which represents that observation. This results in a data visualization that represents the bound dataset. In addition to creating the graphic objects, in some embodiments, color may be bound to the graphic objects and/or the underlying dataset. For example, color may be bound to the graphic objects of a data visualization based on the data types of their bound dataset (e.g., numerical data types can be linked to gradients, while category types can be linked to single colors, etc.). For numerical data types, the designer can choose between various color spaces for the gradient to traverse. A gradient between the same first color and last color will traverse a different set of color values depending on the color space it traverses. By allowing the designer to choose between color spaces, a gradient can be chosen that more clearly depicts the variation in data values.

Additionally, one challenge when choosing colors for a data visualization is that the luminosity of the chosen colors may be perceived as adding or diminishing emphasis from certain values. This can result in a data visualization that leaves a mistaken impression in its viewer. To address this, embodiments provide a color picker to aid the designer in selecting colors for a data visualization. The color picker may include a luminosity graph which provides a visual representation of the luminosity of the chosen colors. This simplifies the process for designers to compare the luminosity of colors (e.g., color stops, colors, etc.) when designing their data visualizations.

As such, embodiments improve the data visualization creation process through both data binding and color binding. In particular, color binding simplifies the mapping of color data to the underlying data source that the chart is based on, making it easier for designers to create their preferred data visualization. Although prior techniques exist which allow for the designer to navigate different color spaces, these techniques do not bind colors to any particular dataset. As such, any color manipulation is not performed natively as the designer prepares the data visualization, but instead requires a separate tool and/or specialized coding to incorporate the color selections from a separate tool into the data visualization. Further, any subsequent changes to the data, the color choices, etc., require the same processes to be performed all over again. Because embodiments make color binding and selection a native feature, the time and computing resources needed to create, update, and/or modify a data visualization are greatly reduced.

Figure 1:
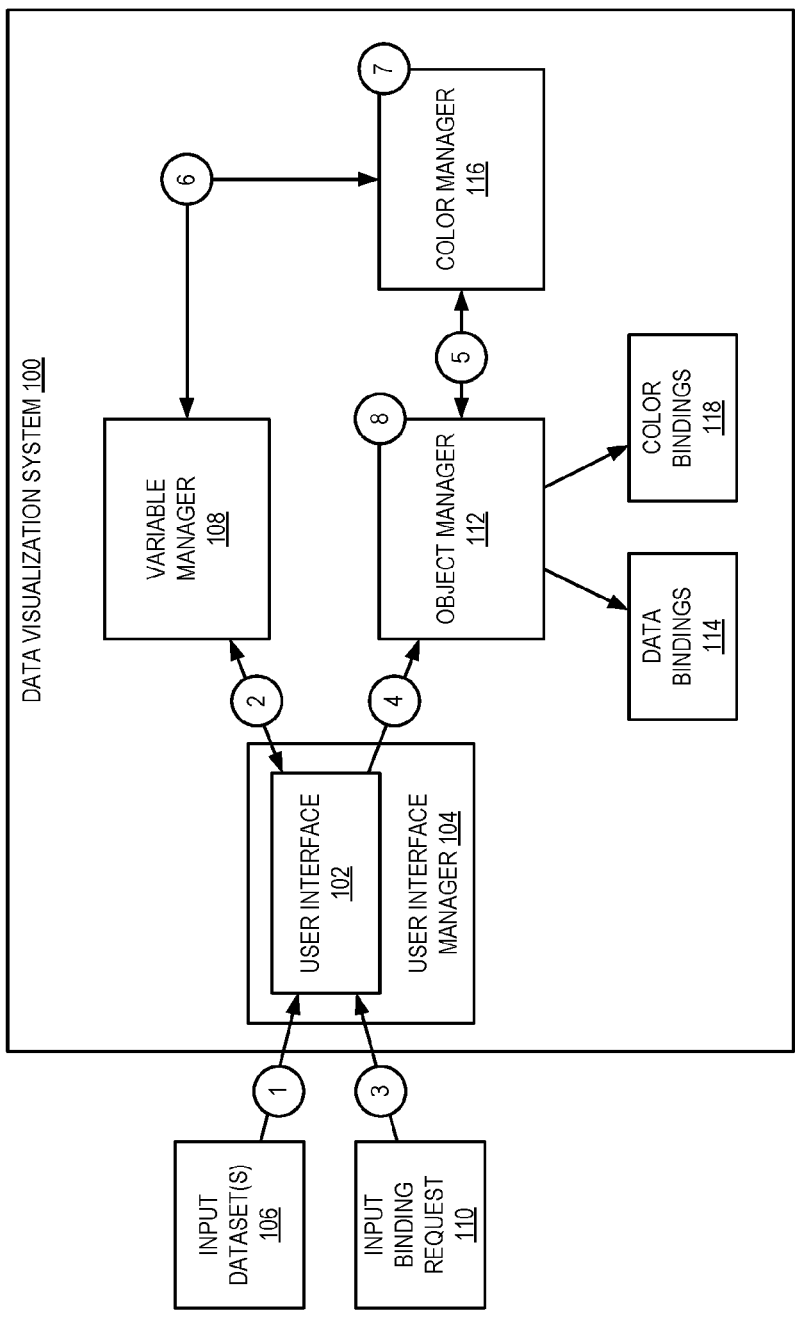
FIG. 1 illustrates a diagram of a process of generating data visualizations based on multiple datasets in accordance with one or more embodiments.

FIG. 1 illustrates a diagram of a process of generating data visualizations based on multiple datasets in accordance with one or more embodiments. As shown in FIG. 1, a data visualization system 100 may enable designers, or other users, to generate data visualizations from underlying source data. Data visualization system 100 may be implemented as part of a graphic design application, such as a vector graphic design application, which enables designers to create various graphic objects (e.g., shapes, lines, text boxes, etc.). In some embodiments, the data visualization system 100 executes on a computing device, such as a PC, laptop, server or any other device including one or more processors capable of executing computer-readable instructions stored on a storage medium.

The data visualization system 100 includes a user interface 102 through which a designer can interact with the data visualization system to create a drawing including graphic objects and bind those graphic objects to data. A user interface manager 104 provides the user interface and manages processing of data received through the user interface 102. Additionally, the user interface manager handles rendering of the user interface based on user inputs and other processing by the data visualization system 100. The user interface 102 may include a digital canvas on which the designer may create various designs (e.g., draw lines and shapes, add text, images, etc.). For example, the designer can create a graphical object via the user interface (e.g., using a draw tool, shape tool, etc.). This may include drawing an arbitrary shape in the user interface 102, selecting an existing shape on the digital canvas, etc. For example, if the designer is drawing a bar chart, then the designer may use a shape tool to draw a rectangle (e.g., to represent one of the bars of the bar chart).

As shown at numeral 1, the designer may provide input datasets 106 to the data visualization system. The data may be input directly into the data visualization system (e.g., entered manually, copy pasted, etc.) or provided from another source, such as a file including the dataset (e.g., a spreadsheet, database, etc.). Such a file may be imported from a local storage location (e.g., on the same computing device on which the data visualization system is executing) or a remote storage location accessible via a network. In some embodiments, the designer may provide multiple datasets. For example, the designer may provide one dataset, as discussed above, and then similarly provide additional datasets until all desired datasets have been provided. Alternatively, a data source (e.g., file, etc.) may include multiple datasets which are added to the digital canvas when the data source is provided.

At numeral 2, when the input datasets 106 are received, a variable manager 108 identifies one or more variables from the datasets. These variables may be displayed within the GUI 102 (e.g., in a variables panel, list, or other GUI element). In some embodiments, the variables are identified based on a known data format. For example, labels of columns or rows may be extracted from the dataset based on the data format associated with the dataset. The designer can then bind a variable of the dataset to a visual characteristic of one or more graphic objects. In some embodiments, the variable manager 108 maintains metadata for each dataset received that identifies the data type of each variable identified within the datasets.

In the example of FIG. 1, at numeral 3, the designer provides a binding input 110 via user interface 102. This may include one or more input selections of graphic objects to be bound to a variable of the input dataset 106. In some embodiments, the binding input 110 includes selecting a variable from a variables panel of the user interface 102 and selecting a target on a graphic object. For example, the designer may click, tap, etc. on the selected variable and then drag to a target on a graphic object. Although embodiments are generally discussed with respect to the use of inputs via mouse, trackpad, finger, etc., embodiments may also be used with different input techniques, such as gaze detection, voice commands etc.

At numeral 4, once the variable and target have been selected, they are passed to object manager 112. Object manager 112 is responsible for managing the appearance of graphic objects, maintaining data bindings between variables and graphic objects, as well as creating additional graphic objects based on the bindings. In some embodiments, the visual characteristics of graphic objects that can be bound may vary depending on the selected variable type. For example, the available visual characteristics which the designer may select may include some or all visual characteristics relating to the type of object selected. For instance, the visual characteristics for a geometric shape object (e.g., a "shape") may include width, height, position, orientation, fill, border, opacity. In some embodiments, the area of an object may also be a bindable visual characteristic. Visual properties for an image may include one or more of the previous properties in addition to contrast and brightness properties, and a text box object may include additional properties, including font and spacing. Additionally, the visual characteristics available for selection can be further based on the type of variable selected. For instance, a number variable type may include visual properties that with numerical property values, such as width, height, position, and orientation. Color of a fill or border may also be presented for number type variables. For text type variables, the color of a fill or border may be presented as visual property types.

Once the data has been bound to the selected visual property, a data binding 114 is created between the selected graphic object and selected variable by object manager 112. The data binding creates a relationship between the data and the selected the visual characteristic of the selected graphic object. Each data visualization that is created has its own data binding, linking the specific visual characteristic of the graphic object with the dataset. In some embodiments, the binding creates and binds one object to each row of data from the corresponding variable of the dataset. For example, when data is bound to a rectangle on the digital canvas, it may be bound to a first row of the data and multiple new rectangles are created and bound for the remaining rows of the data. The data binding may be one to one (e.g., data variable=10 is used to set position x=10 or data variable=#FFFFFF is used to set fill color=#FFFFFF). Alternatively, the relationship has an additional layer of complexity, such as color binding scale, e.g., data variable=50 is used to set the fill color to a grey color between 0=white and 100=black. Similarly, the relationship may define a formula between the data variable value and the property (e.g., data variable=1 is sued to set font format=BOLD while data variable=2 is used to set font format=Italic).

In some embodiments, the data binding is maintained and stored by the object manager 112. For example, the data bindings may be stored in a binding data store. In accordance with the association between the variable and the visual property, an observation within the data (such as a row in a spreadsheet) will correspond to a graphic object to which the visual property applies. As discussed, each data observation is mapped to a grouping of graphic objects, which may be referred to as a cell, and at least one graphic object within that cell has a visual property associated with the data variable.

In some embodiments, the object manager 112 also creates additional graphic objects based on the initial graphic object such that each observation in the dataset has a corresponding graphic object. For example, additional graphic objects are created by automatically duplicating or repeating the initial graphic object such that the object type is the same as the initial graphic object. The additional graphic objects may be automatically created and displayed when the designer binds a data variable to a visual property of the initial graphic object. Alternatively, after the binding the designer may instruct the data visualization system to create the additional graphic objects (e.g., by selecting a GUI element). This leads to a data visualization being automatically generated upon binding the initial graphic object to a variable of a dataset. This data visualization includes a plurality of graphic objects that were generated based on the initial graphic object and bound to the same variable of the dataset 106.

In some embodiments, as each object within the plurality of graphic objects is created, the visual property for the object is rendered in accordance with the binding. Specifically, the value for the visual property of a graphic object is based on a variable value for the corresponding observation. This results in data visualization properties which are applied to each graphic object belonging to the data visualization. The new graphic objects may be created such that they are aligned with the initial graphic object in both position and scale. For example, a new coordinate system may be established based on the position of the initial graphic object. The origin of this new coordinate system may correspond to a point, edge, line, or other portion of the initial graphic object, or an offset thereof. This may establish a "zero point" property. By applying the zero-point property to each new graphic object, each graphic object will be aligned. For example, each graphic object may share a starting position on the X axis (e.g., the zero point) but have different positions on the Y axis. Alternative zero points may also be used depending, e.g., on the coordinate space of the data visualization, user input, etc. For example, the zero point may be shared on the Y axis with the X axis position varying between the graphic objects.

Additionally, the visual characteristic of each new graphic object is set such that the value the new graphic object is representing is appropriate relative to the initial graphic object. This results in a scale property which defines a relationship between the bound data value and the visual characteristic value. For example, where the initial graphic object is a bar, the origin may be set to the left edge of the bar. Other origins may also be used, either selected automatically by the data visualization system, by the designer, etc. If the data is bound to the length of the bar, then each newly generated bar's length will be set such that each bar represents that length on the same scale as the initial bar. By sharing the scale property, the graphic objects of the data visualization provide a readily understandable representation of the underlying data and how the data varies from observation to observation.

At numeral 5, the object manager 112 can request colors for the data visualization from color manager 116. Color manager 116 is responsible for selecting and binding color data to the data visualization. Different types of data are bound to color differently. For example, if the data is categorical then each category is bound to a color, whereas if the data is numerical, it may be represented by a gradient. For example, at numeral 6, the color manager 116 can determine the data type of the data bound to the data visualization from variable manager 108. Alternatively, the object manager 112 can include the data type with its request at numeral 5. As part of color selection, color manager 116 can create a color binding 118. The color binding 118 may represent a mapping of color data to the bound data, this may include a relationship between data values and color values. For example, for numerical data represented by a gradient this may include the color stops of the gradient and a mapping from the numerical data values to the color values on the gradient; for numerical data that is binned, the binding may indicate the bin values and associated color values; for categorical data, the binding may include the category to color mapping, etc. At numeral 7, the color manager 116 can the provide the color binding(s) to the object manager.

In some embodiments, the color manager may determine color stops or steps for the data visualization based on the scale property of the data visualization. The scale property may include a maximum and minimum value of the data visualization. Based on these extrema values, the color manager can determine, e.g., a number of color stops or steps. For example, the length of the scale may be determined, and the number of color stops or steps may be determined based on the length. This length may represent a number of values, such as integer values or other values, between the maximum and minimum values and compared to a number of preset threshold values. Alternatively, statistical characteristics of the scale and/or dataset may be used to determine the number of color stops or steps. This may include clustering techniques, the mean/median/mode/ standard deviation, etc. The associated color values for these color stops/steps may be determined based on default values, user preferences, other colors in use on the digital canvas, etc.

At numeral 8, object manager 112 causes the data visualization to be rendered in color based on the color bindings 118 associated with the bound dataset. In some embodiments, the color manager is also responsible for presenting color options to the designer during data visualization creation (e.g., via a color picker tool and/or data panel in the user interface 102). If the designer makes changes to the color data, the color manager 116 generates updated color bindings and provides them to the object manager which then replaces the existing color bindings with the updated color bindings.

There are a number of benefits to working with data bound objects rather than hard coded, or manually constructed visualizations. For example, if the underlying dataset is changed or updated, the corresponding bound visualization is likewise updated. In such an instance, the corresponding data binding is updated by object manager 112 and the updated data binding is stored to binding data store, replacing any previous data bindings 114. Any changes to the visual characteristics as a result of the new underlying dataset are automatically rendered accordingly. Likewise, any changes to the colors to be applied to the data visualization cause the color manager to create new color bindings 118 which similarly replace previous color bindings and cause the colors applied to the data visualization to be automatically updated. This saves significant effort that would otherwise be required to update manually constructed charts. Additionally, no specialized coding knowledge is required to create the visualization. Instead, sophisticated data visualizations can be constructed by anyone capable of using a graphic design tool and access to the data to be visualized.

Figure 2:
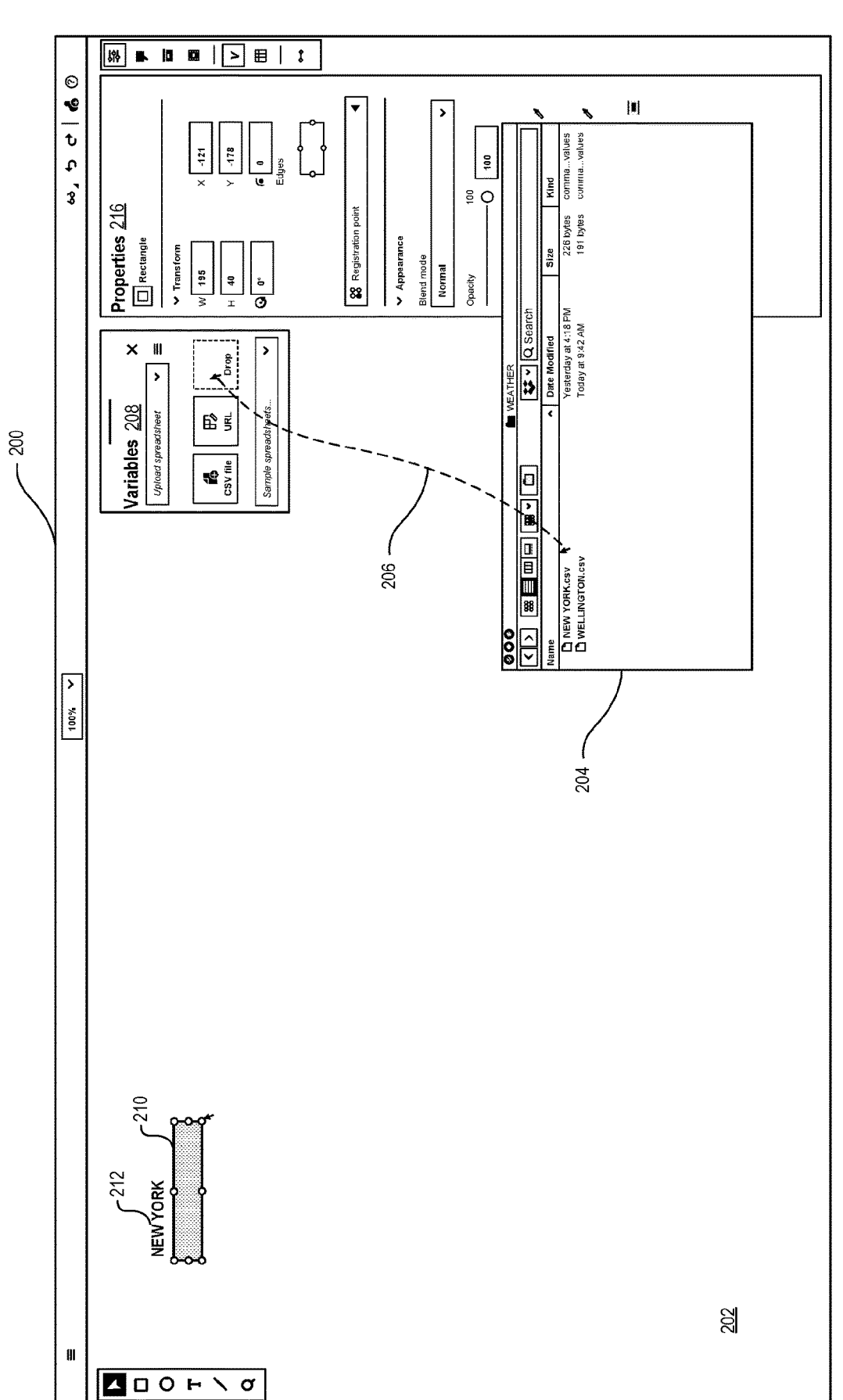
FIG. 2 illustrates a diagram of a user interface that enables generating a data visualization from data bound objects in accordance with one or more embodiments.

FIG. 2 illustrates a diagram of a user interface 200 that enables generating a data visualization from data bound objects in accordance with one or more embodiments. As shown in FIG. 2, the user interface 200 can include a digital canvas 202 which provides an area in which the designer can draw graphic objects, create data visualizations, etc. As discussed, the designer can provide a dataset to be bound to graphic objects. In the example of FIG. 2, the designer has local datasets NEW YORK.csv and WELLINGTON.csv, as shown at 204. In this instance, the designer provides the NEW YORK.csv dataset by dragging and dropping 206 the dataset into variables panel 208. Additionally, in the example of FIG. 2, the designer has drawn a rectangle geometric shape 210 and a text box 212 including the text NEW YORK. The rectangle 210 has been selected, which results in properties panel 216 showing various properties of the rectangle (e.g., width, height, position, etc.).

Figure 3:
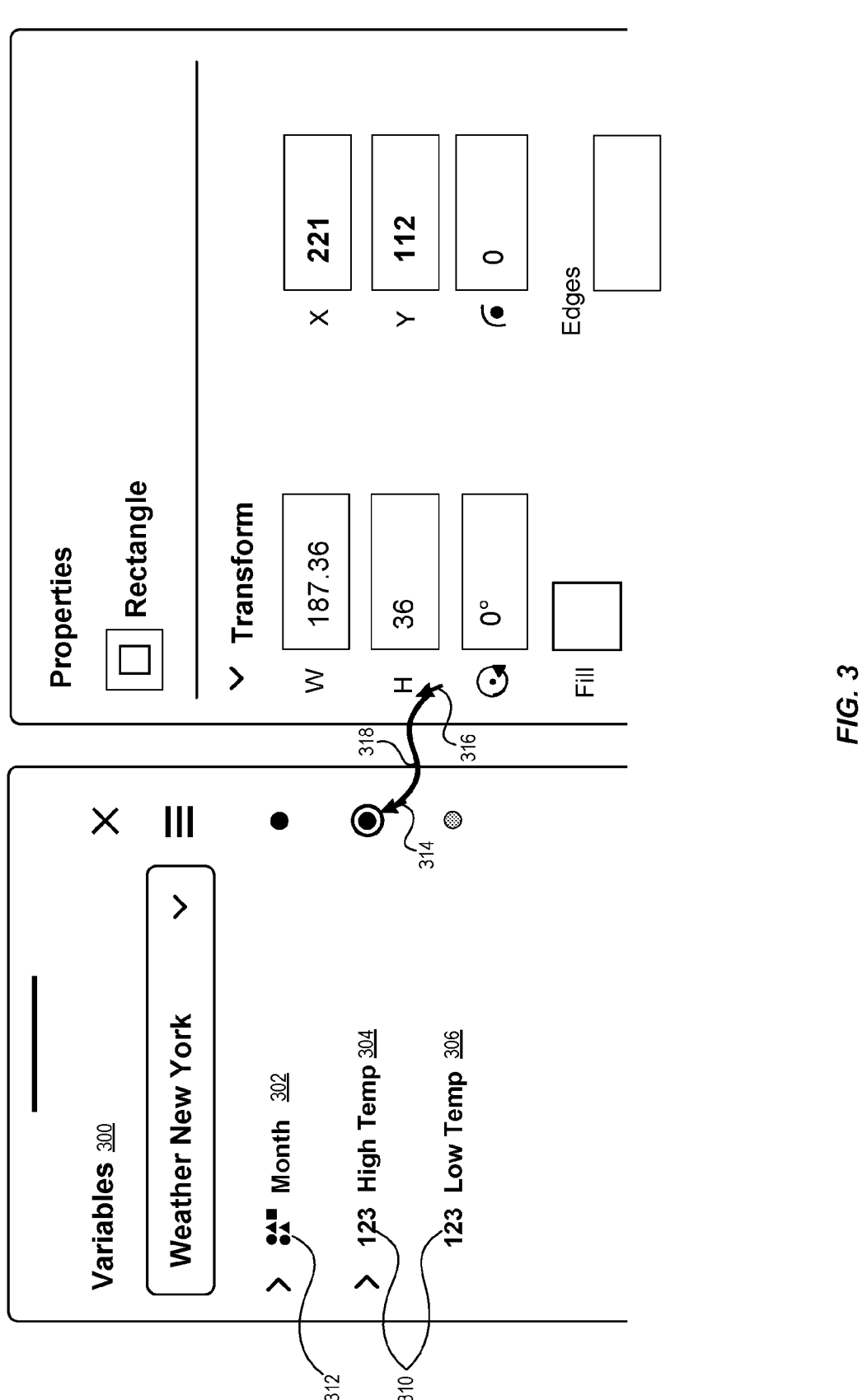
FIGS. 3 and 4 illustrate an example of binding data to a property of a graphic object in accordance with one or more embodiments.
Figure 4:
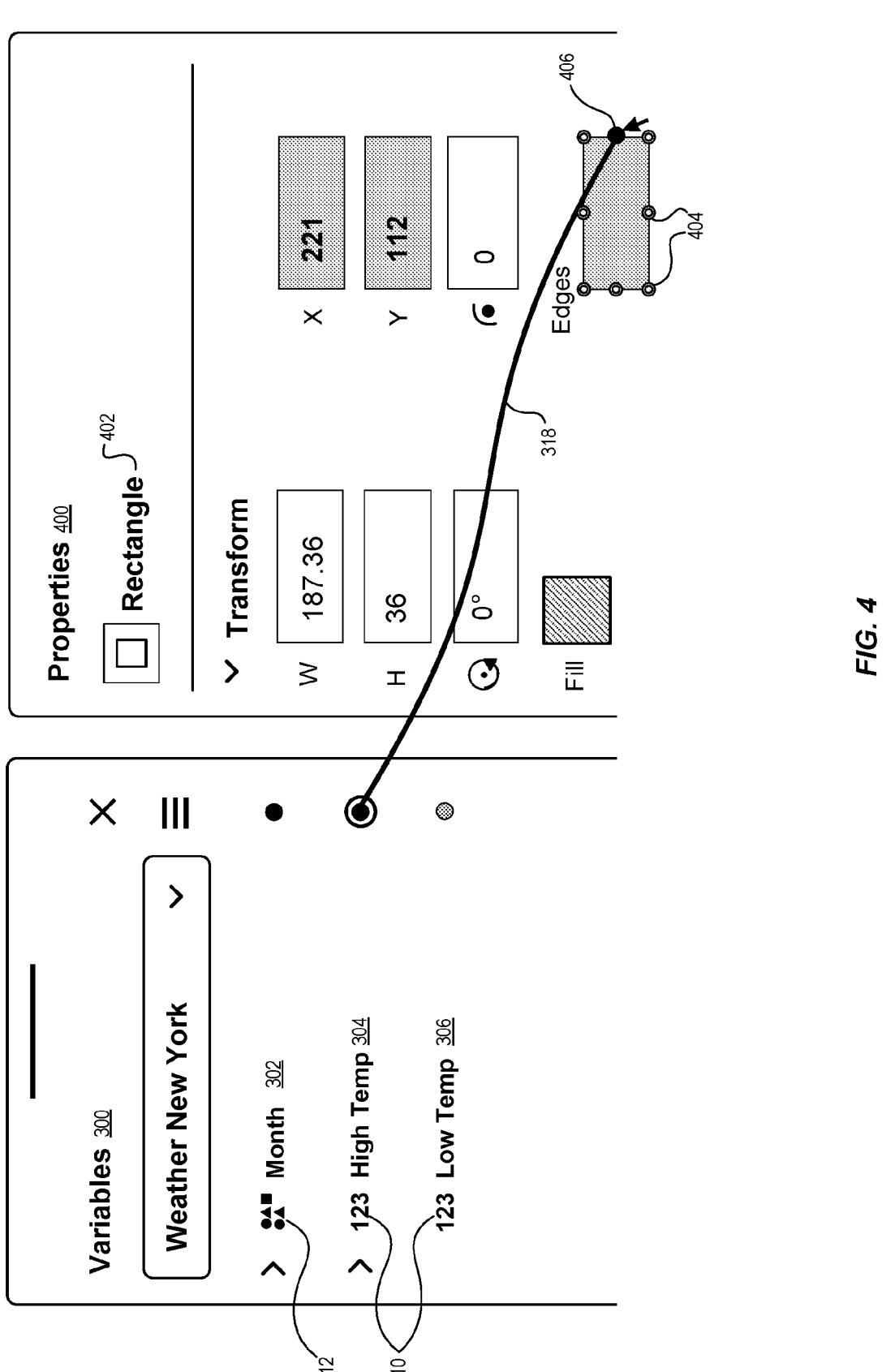

FIGS. 3 and 4 illustrate an example of binding data to a property of a graphic object in accordance with one or more embodiments. Continuing the example from FIG. 2, once the dataset has been provided, the data visualization system (e.g., variable manager 108) identifies variables associated with the dataset. This is reflected in variables panel 300, which now shows three variables associated with the dataset: month 302, high temp 304, and low temp 306. Additionally, the variables panel further identifies a type associated with each variable. For example, high temp 304 and low temp 306 are indicated as being numerical types 310 while month 302 is indicated as being categorical type 312.

As discussed, the designer can bind variables from the dataset to visual characteristics of a graphic object. The designer can select a variable (e.g., tap, click, etc.) to be bound to a property of a graphic object. In this example, the designer selects the high temp 304 variable as shown at 314. Thereafter, as the designer moves the cursor to a new position (e.g., via tap and drag, click and drag, or other gesture or movement), a visual indicator 318 is displayed. The visual indicator 318 extends from the selected variable to the current position of the cursor. This makes it clear which variable is currently being bound. In some embodiments, when the variable is selected, in addition to the visual indicator, the properties panel is updated with targets associated with properties to which the selected variable can be bound.

For example, as shown in FIG. 4, In this example, a rectangle (e.g., shape 210) was selected on the digital canvas. As a result, properties panel 400 shows the properties of rectangle 402. In particular, several properties in the properties panel have been greyed-out, as compared to their counterparts in FIG. 3. This indicates that they are available for binding (e.g., position, fill, and edges) to the high temp dataset 304. Additionally, targets 404 have been added to edges of the rectangle which further indicate potential properties that may be bound to the dataset. In this instance, the high temperature variable 304 is being bound to the right edge 406 of the selected graphic object (in this case rectangle 402). Further, as shown in FIG. 4, the visual indicator 318 has continued to follow the cursor position and now visually links the high temp variable 304 and the right edge property 406 of the graphic object. As discussed, the visual indicator may follow the path of the cursor on the digital canvas or may be a line or curve (e.g., a path object) linking the selected variable to the current position of the cursor.

Upon release (e.g., releasing the click, removing the finger or stylus from the screen, etc.) the selected variable is bound to the selected property. Depending on the number of rows associated with the high temp variable 304 additional graphic objects being generated and bound to a different row. Each new graphic object is automatically sized based on the data binding. In this example, the right edge of each graphic object is positioned based on the linked value from the high temp variable 304. Data bindings for each object are generated and stored.

Although FIG. 4 shows binding being performed between the variables panel 300 and the properties panel 400, in various embodiments such binding may be performed from the variables panel to the graphic object directly on the digital canvas, e.g., by selecting the high temp variable (or other variable of interest) and linking it to the right edge of the graphic object.

Figure 5:
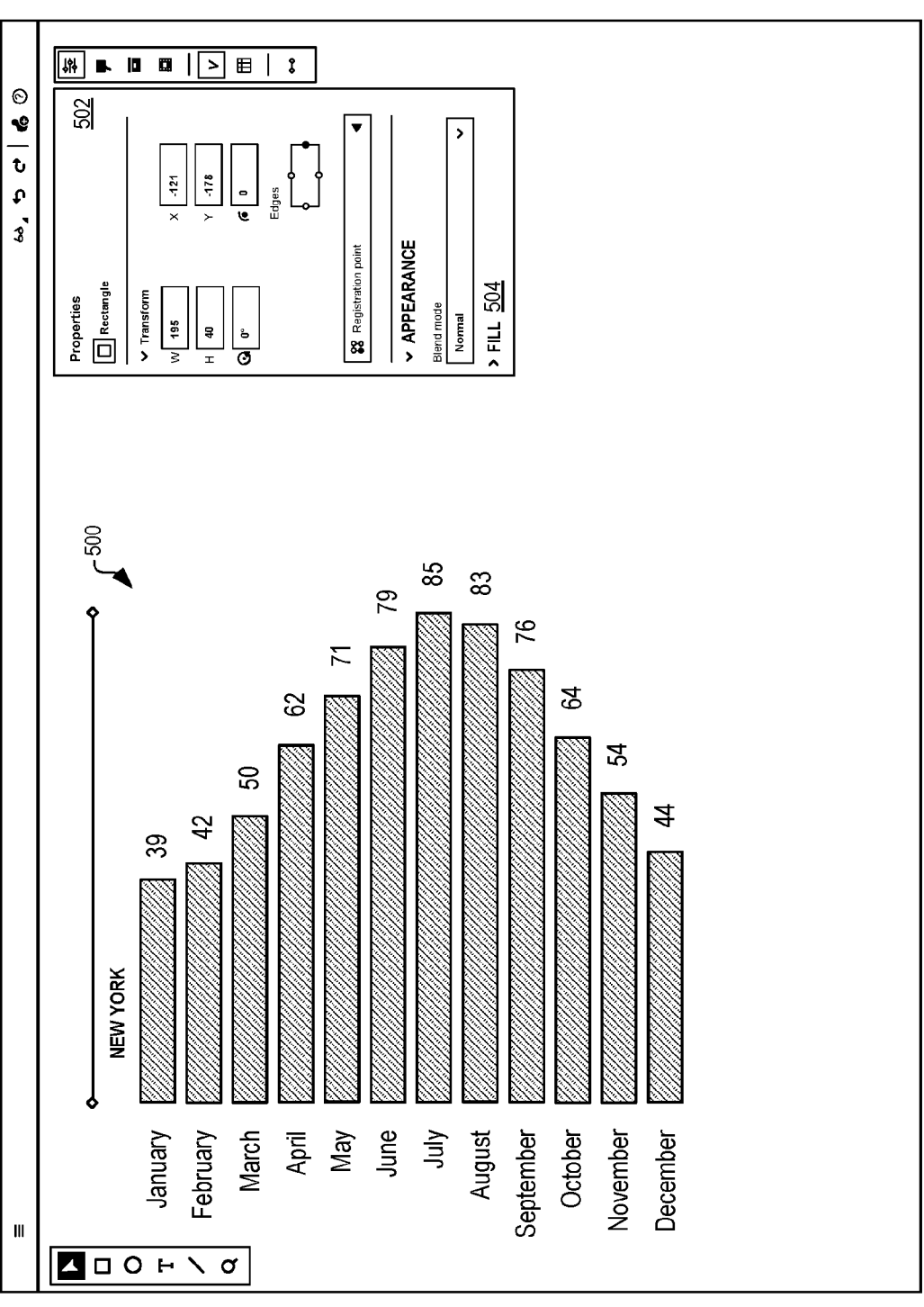
FIGS. 5 and 6 illustrate a diagram of a user interface for binding color to a data visualization in accordance with one or more embodiments.
Figure 6:
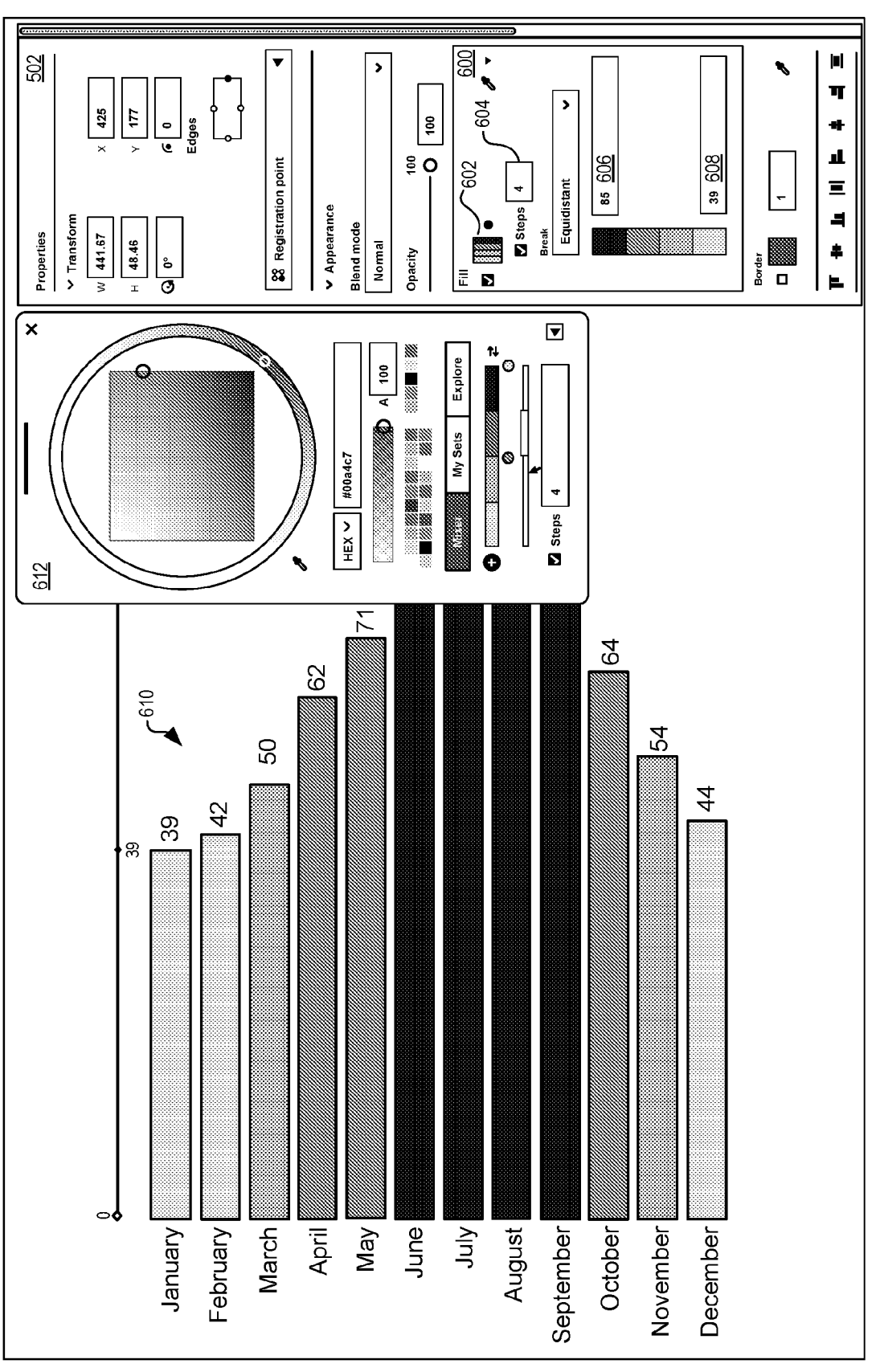

FIGS. 5 and 6 illustrate a diagram of a user interface for binding color to a data visualization in accordance with one or more embodiments. As discussed, once a graphic object has been bound to a dataset, the data visualization system (e.g., object manager 112) generates additional graphic objects corresponding to each observation from the bound dataset. In the example of FIG. 5, this results in additional rectangle graphic objects being generated, corresponding to the high temperature for each month of the year for New York. As a result, a bar chart data visualization 500 is created based on the New York high temperature variable.

As discussed, in some embodiments, the data visualization may have default colors applied to it. For example, data visualization 500 has a default fill, represented in the example of FIG. 5 as a pattern fill. By default, the data visualization system may apply the same color (and other properties) as the initial graphic object or may apply a color scheme based on the data type associated with the bound dataset. The designer can update the colors of the data visualization 500 by selecting the Fill 504 details from the properties panel 502.

As shown in FIG. 6, once the Fill 504 details have been selected, the designer is presented with fill panel 600. Fill panel 600 enables the designer to tailor the colors used in the data visualization. For example, the designer can choose a fill type 602. For numerical data, such as that represented by the data visualization in FIG. 6, the designer can select between a gradient fill or binned fill. For binned fills, the designer can identify color steps 604, a color space, and high 606 and low 608 values. If the high 606 and low 608 values match the extrema of the dataset (e.g., the highest temperature is 85 and the lowest temperature is 39) then the starting color step and the ending color step would both be represented in the data visualization. However, the high 606 and low 608 values can be larger and smaller, respectively, than are present in the associated dataset. In such instances, this would mean that the colors shown in the data visualization would potentially cover a lower range of colors than the possible range of colors bound to the dataset.

In the example of FIG. 6, the colors have been binned into four bins (e.g., steps 604). The four bins are spaced equi-distantly, though other breakpoints (e.g., quartiles, logarithmic, k-means clusters, etc.) may also be used. This results in data visualization 610, where the warmest months of June-September have the highest color bin fill, the next warmest months of April, May, and October have the next highest color bin fill, cooler months March and November have the next color bin fill, and the coolest months of December-February have the lowest color bin fill In addition to binned fills, the fill panel 600 allows for the designer to choose gradient fills. For gradients, the designer can select a color space and color stops. The designer can additionally specify a range of data values associated with the gradient which, like the binned fill, may match the range of data values or exceed the range of data values. In some embodiments, the user interface can include a color picker 612 which enables the designer to add or remove color stops or steps and explore the color space, as discussed further below with respect to FIG. 7.

FIG. 7 illustrates a diagram of a color picker in accordance with one or more embodiments. As shown in FIG. 7, color picker 700 enables the designer to change the colors bound to their data visualization. For example, the color picker allows for the designer to choose color stops (for gradients) or color steps (for bins). Similarly, for categorical data, the color picker allows the designer to pick a color for each category. Additionally, different types of numerical data may require more or fewer colors to be selected. For example, sequential data may require colors to be picked at each end of the scale. For divergent data, colors need to be chosen for the extrema as well as a middle value. Beyond those considerations, the designer can choose as many or as few colors as they desire.

Additionally, the color picker allows the designer to choose the color space 702. A gradient traveling through different color spaces (LCH, HSL, LAB, LRGB, RGB, etc.) will intersect different colors. This may result in a set of similar colors in one color space and contrasting colors in a different color space. Giving the designer control over the color space used makes it easier for the designer to choose the colors that best suit their data visualization and planned usage thereof. Further, the gradient path may be defined by the designer (e.g., as a line, a Bezier curve, etc.).

As discussed, one challenge with colors is choosing colors that do not skew the viewer's perspective in unintended ways. For example, colors that are difficult for some users to discern may lead to misinterpretations. Likewise, colors that appear brighter or dimmer may suggest to the viewer that the data represented by these colors is more or less important, even if the designer just chose contrasting colors. Accordingly, embodiments include a luminosity chart 704 as part of color picker 700. The luminosity chart displays the luminosity of each chosen color as a graph, making it easy for the designer to compare the luminosity values of each color. In the example of FIG. 7, the first color and the last color have significantly different luminosities. This may lead the designer to select a new color so that the colors have more similar luminosities. In some embodiments, the data visualization system may recommend a color close to the original first color but with a luminosity closer to the original second color. The luminosity can be obtained from the color value in HSL, by converting the color value from its color space to HSL, or other techniques. By presenting the luminosity values as a chart 704, the designer can more easily identify their desired colors for their data visualization.

FIG. 8 illustrates a diagram of a user interface panel for choosing fill properties in accordance with one or more embodiments. As discussed, in some embodiments, the designer can choose a gradient fill for numerical data. In the example of FIG. 8, the designer has selected gradient fill 800 in fill panel 802. As a result, there are no steps, and data values are mapped to specific color values along the gradient. In this example, the designer selects a maximum 804 and minimum 806 value to map the gradient to the data values. Here those values correspond to the extrema of the dataset, however, the values maximum and minimum values may define a wider range of values than the dataset. As shown at 808, this results in mapping fill colors to the graphic objects based on the specific data value those graphic objects are bound to, producing a more continuous range of values from the gradient as compared to the binned example described above.

FIGS. 9 and 10 illustrate a diagram of a user interface for copying color binding settings from one data visualization to another in accordance with one or more embodiments. As shown in FIG. 9, the digital canvas includes two data visualizations: a high temperature bar chart for New York 900 and a high temperature bar chart for Wellington 902. As discussed, the colors for each data visualization are defined by color bindings, which map color values to underlying data values. Because of this, the color scheme of one data visualization can be quickly applied to others by copying the color bindings from one data visualization to another. This effectively creates a new color binding that defines the same relationship of color to data values, but changes the dataset to which it is bound to be the dataset of the other data visualization.

In the example of FIG. 9, the designer selects the eye dropper tool 904 from the fill panel. Using the eye dropper tool, the designer then selects 906 the New York data visualization 900. Upon selection, the object manager retrieves the color binding associated with the New York data visualization. The designer then selects 908 the Wellington data visualization 902. The object manager then updates the color binding associated with the Wellington data visualization using the color binding from the New York data visualization. For example, the color binding associated with the New York data visualization 900 defines four bins, equidistantly spaced, across a range of values from 85 to 39. These same relationships of color values to data values are then stored as the color binding for the Wellington data visualization 902.

This results in updated Wellington data visualization 1000, as shown in FIG. 10. Since both data visualizations use the same color bindings, the data they represent are easily compared visually. However, because the range of values of the Wellington dataset is less than that of the New York dataset (e.g., Wellington has a maximum value of 70 and a minimum value of 53), the Wellington data visualization 1000 maps its colors to only the middle two bins, as compared to the New York data visualization 900 which includes values mapped to all four bins. If the designer so chooses, they may further edit the Wellington data visualization 1000 to add more bins, change the breaks, etc. to add more colors to the data visualization.

FIG. 11 illustrates a schematic diagram of data visualization system 1100 (e.g., "data visualization system" described above) in accordance with one or more embodiments. As shown, the data visualization system 1100 may include, but is not limited to, user interface manager 1102, object manager 1104, variable manager 1106, color manager 1108, and storage manager 1110. The storage manager 1110 includes datasets 1118, data bindings 1120, and color bindings 1122.

As illustrated in FIG. 11, the data visualization system 1100 includes a user interface manager 1102. For example, the user interface manager 1102 allows users to create graphic objects and bind them to data to create data visualizations. In some embodiments, the user interface manager 1102 provides a user interface through which the user can interact with the data visualization system and individual data visualizations, as discussed above. Alternatively, or additionally, the user interface may enable the user to download data visualizations from a local or remote storage location (e.g., by providing an address (e.g., a URL or other endpoint) associated with a storage location).

Additionally, the user interface manager 1102 allows users to bind colors to their data visualizations. For example, the user interface manager can include a fill panel and/or color picker which enables the user to select various fill options, define a color to data mapping, select and compare colors, etc. As discussed, when the designer creates a new data visualization, the data visualization may be associated with default colors. The default colors may be whatever colors and other visual properties are associated with the initial graphic object. Alternatively, the default colors may be automatically determined by the data visualization system based on the data type, range of data values, prior color selections by the designer, etc. Once the data visualization has been created, the designer may be presented with the fill panel and/or color picker via the user interface. As discussed, the designer can then select a fill type (e.g., gradient, binned, etc.). In some embodiments, the fill types available may vary depending on the data type. The designer can select color stops or steps, breakpoints, color space, gradient interpolation, and other color properties. Additionally, the user interface includes a luminosity chart which allows for designers to compare the luminosity of their selected colors.

As illustrated in FIG. 11, the data visualization system 1100 includes an object manager 1104. The object manager 1104 is responsible for binding graphic objects to a dataset. In particular, the object manager can be used to construct a data visualization from scratch, as discussed above. For example, the object manager 1104 binds a visual characteristic of a graphic object to a variable from a dataset 1118. In some embodiments, there may be a visual indicator of the binding. In some embodiments, the data bindings 1120 are maintained and stored by the object manager or storage manager. The data binding represents a relationship between the visual characteristic and the data values of the variable. This can be a one-to-one relationship, a linear relationship, a non-linear relationship, a relationship defined by a specific formula, etc.

As a result of the data binding, any change to the data in the dataset to which it is bound results in a change to the visual characteristic of the graphic object. Likewise, if the underlying dataset associated with the binding is swapped for another dataset, then the bindings are updated to be associated with the new dataset. The bound visual characteristic is then automatically updated to reflect the new dataset. Further, when the data is bound to a graphic object, if the variable is associated with multiple observations, then multiple graphic objects may be created and bound, each having the same visual characteristic bound to the dataset.

The object manager 1104 is also responsible for managing color bindings. Similar to data bindings, color bindings represent a relationship between color data and data values from the bound dataset. This may be a mapping of data values to a specific color value, where multiple data values map to one color value (e.g., where the data is binned) or each data value maps to a different color value (e.g., for gradients, categorical data, etc.).

As illustrated in FIG. 11, the data visualization system 1100 includes variable manager 1106. When a new dataset is received (e.g., uploaded, manually entered, etc.), the variable manager 1106 is responsible for identifying one or more variables from the datasets. For example, the variable manager 1106 may parse the dataset based on a format of the dataset to identify one or more variables included in the dataset. These variables may be displayed within the user interface (e.g., in a variables panel, list, or other GUI element). In some embodiments, the variables are identified based on a known data format. For example, labels of columns or rows may be extracted from the dataset based on the data format associated with the dataset. The designer can then bind a variable of the dataset to a visual characteristic of one or more graphic objects. Additionally, the variable manager 1106 identifies a data type associated with each variable (e.g., text data, numerical data, etc.).

As illustrated in FIG. 11, the data visualization system 1100 includes color manager 1108. The color manager 1108 is responsible for selecting and binding color data to the data visualization. As discussed, different types of data are bound to color differently (e.g., if the data is categorical then each category is bound to a color, whereas if the data is numerical, it may be represented by a gradient or color steps, etc.). The color manager can obtain the data type associated with a data visualization from the variable manager 1106 and present fill options based on the data type via the user interface. The color manager 1108 also creates color bindings 1122. As discussed, a color binding 1122 may represent a mapping of color data to the bound data, this may include a relationship between data values and color values. For example, for numerical data represented by a gradient this may include the color stops of the gradient and a mapping from the numerical data values to the color values on the gradient; for numerical data that is binned, the binding may indicate the bin values and associated color values; for categorical data, the binding may include the category to color mapping, etc. The color manager 1108 can the provide the color binding(s) to the object manager 1104. Additionally, as discussed, if the designer changes the colors of the data visualization, the color manager 1108 can create new color bindings that define the new colors and provide them to the object manager 1104.

As illustrated in FIG. 11, the data visualization system 1100 also includes the storage manager 1110. The storage manager 1110 maintains data for the data visualization system 1100. The storage manager 1110 can maintain data of any type, size, or kind as necessary to perform the functions of the data visualization system 1100. The storage manager 1110, as shown in FIG. 11, includes the datasets 1118. As discussed, datasets 1118 can be input directly into the data visualization system (e.g., entered manually, copy pasted, etc.) or provided from another source, such as a file including the dataset (e.g., a spreadsheet, database, etc.). Such a file may be imported from a local storage location (e.g., on the same computing device on which the data visualization system is executing) or a remote storage location accessible via a network. The data visualization system can identify one or more variables associated with the data and present the variables to the user (e.g., via a variable or data user interface element, such as a window, overlay, panel, etc.).

As further illustrated in FIG. 11, the storage manager 1110 also includes data bindings 1120. As discussed, the data bindings represent a relationship between a visual characteristic and data. The data binding creates a relationship between the data and the selected the visual characteristic of the selected graphic object. In some embodiments, the binding creates and binds one object to each row of data from the corresponding variable of the dataset. The data binding may be one to one (e.g., data variable=11 is used to set position x=11 or data variable=#FFFFFF is used to set fill color=#FFFFFF). Alternatively, the relationship has an additional layer of complexity, such as color binding scale, e.g., data variable=50 is used to set the fill color to a grey color between 0=white and 110=black. Similarly, the relationship may define a formula between the data variable value and the property (e.g., data variable=1 is sued to set font format=BOLD while data variable=2 is used to set font format=Italic). If the underlying data is swapped, then the binding(s) 1120 are updated using the new dataset.

As further illustrated in FIG. 11, the storage manager also includes color bindings 1122. Color bindings 1122 represent a relationship between color data and data values from the bound dataset. The color bindings may specify the dataset to which the colors are bound, a fill type (e.g., gradient, solid, binned, etc.), color stops or steps, a mapping between color values and data values, breakpoints, etc. In some embodiments, the color binding is generated automatically. For example, the scale property of the data visualization may be used to determine color stops or color steps for the data visualization. For example, the number of color stops or steps may be based on the scale of the data visualization and the color values of the color stops or steps may be based on default color values, user preferences, other colors in use on the digital canvas, etc.

In some embodiments, the storage manager also includes data visualization properties. As discussed, when data is bound to a graphic object, additional graphic objects are created for each observation in the dataset. These new graphic objects have a visual property that is rendered in accordance with the data binding. For example, the value for the visual property of a graphic object is based on a variable value for the corresponding observation. To ensure that each graphic object is created consistently with the data visualization, the data visualization system 1100 maintains data visualization properties which are applied to each graphic object belonging to a given data visualization.

In some embodiments, the data visualization properties include at least a scale property and a zero-point property. The zero-point property is used to align new graphic objects as they are created. For example, a new coordinate system may be established based on the position of the initial graphic object. The origin of this new coordinate system, which may correspond to a point, edge, line, or other portion of the initial graphic object, or an offset thereof, is the zero point for graphic objects belonging to this data visualization. By applying the zero-point property to each new graphic object, each graphic object will be aligned. For example, each graphic object may share a starting position on the X axis (e.g., the zero point) but have different positions on the Y axis. Alternative zero points may also be used depending, e.g., on the coordinate space of the data visualization, user input, etc. For example, the zero point may be shared on the Y axis with the X axis position varying between the graphic objects.

The scale data visualization property ensures that new graphic objects represent values of the dataset consistently with the initial graphic object. The scale property may define a relationship between the bound data value and the visual characteristic value. For example, where the initial graphic object is a bar, if the data is bound to the length of the bar, then each newly generated bar's length will be set such that each bar represents that length on the same scale as the initial bar. By sharing the scale property, the graphic objects of the data visualization provide a readily understandable representation of the underlying data and how the data varies from observation to observation.

Each of the components 1102-1110 of the data visualization system 1100 and their corresponding elements (as shown in FIG. 11) may be in communication with one another using any suitable communication technologies. It will be recognized that although components 1102-1110 and their corresponding elements are shown to be separate in FIG. 11, any of components 1102-1110 and their corresponding elements may be combined into fewer components, such as into a single facility or module, divided into more components, or configured into different components as may serve a particular embodiment.

The components 1102-1110 and their corresponding elements can comprise software, hardware, or both. For example, the components 1102-1110 and their corresponding elements can comprise one or more instructions stored on a computer-readable storage medium and executable by processors of one or more computing devices. When executed by the one or more processors, the computer-executable instructions of the data visualization system 1100 can cause a client device and/or a server device to perform the methods described herein. Alternatively, the components 1102-1110 and their corresponding elements can comprise hardware, such as a special purpose processing device to perform a certain function or group of functions. Additionally, the components 1102-1110 and their corresponding elements can comprise a combination of computer-executable instructions and hardware.

Furthermore, the components 1102-1110 of the data visualization system 1100 may, for example, be implemented as one or more stand-alone applications, as one or more modules of an application, as one or more plug-ins, as one or more library functions or functions that may be called by other applications, and/or as a cloud-computing model. Thus, the components 1102-1110 of the data visualization system 1100 may be implemented as a stand-alone application, such as a desktop or mobile application. Furthermore, the components 1102-1110 of the data visualization system 1100 may be implemented as one or more web-based applications hosted on a remote server. Alternatively, or additionally, the components of the data visualization system 1100 may be implemented in a suite of mobile device applications or "apps."

FIGS. 1-11, the corresponding text, and the examples, provide a number of different systems and devices that allows a user to change coordinate systems for data bound objects. In addition to the foregoing, embodiments can also be described in terms of flowcharts comprising acts and steps in a method for accomplishing a particular result. For example, FIG. 12 illustrates a flowchart of an exemplary method in accordance with one or more embodiments. The method described in relation to FIG. 12 may be performed with fewer or more steps/acts or the steps/acts may be performed in differing orders. Additionally, the steps/acts described herein may be repeated or performed in parallel with one another or in parallel with different instances of the same or similar steps/acts.

FIG. 12 illustrates a flowchart 1200 of a series of acts in a method of generating a data visualization bound to color in accordance with one or more embodiments. In one or more embodiments, the method 1200 is performed in a digital medium environment that includes the data visualization system 1100. The method 1200 is intended to be illustrative of one or more methods in accordance with the present disclosure and is not intended to limit potential embodiments. Alternative embodiments can include additional, fewer, or different steps than those articulated in FIG. 12.

As illustrated in FIG. 12, the method 1200 includes an act 1202 of receiving a dataset including data associated with a variable. As discussed, the designer may add the dataset to the data visualization system directly (e.g., manual entry, copy-paste, etc.) or via a file that includes the dataset (e.g., a spreadsheet, database, etc.).

As illustrated in FIG. 12, the method 1200 also includes an act 1204 of generating a chart, including a plurality of graphic objects, based on the variable of the data set and a visual property of the plurality of graphic objects. For example, the designer can draw a graphic object on a digital canvas. The digital canvas may include a variety of drawing tools that enable a designer to draw on the canvas. For example, the designer may sketch a shape on a digital canvas shape tool. The designer may similarly add lines, curves, or other path objects, add or change color fills, or otherwise add or modify visual properties of graphic objects on the digital canvas. Additionally, or alternatively, the designer may add text to a text box, import an image, etc. The chart can be generated by binding the dataset to a visual property of the graphic objects such that the visual property represents a data value from the dataset. Once the binding has been created, additional bound graphic objects can be created corresponding to additional observations from the dataset. This results in the chart being created.

As illustrated in FIG. 12, the method 1200 also includes an act 1206 of determining a data type associated with the variable. As discussed, the dataset may include one or more variables which may include data of different types. For example, the dataset may include categorical data, numerical data, etc. In some embodiments, a variable manager parses the dataset to identify the variables and data types included in the dataset.

As illustrated in FIG. 12, the method 1200 also includes an act 1208 of assigning first colors to the plurality of graphic objects based on the data type using a color binding. In some embodiments, the color binding defines a relationship between color values of the first colors and data values of the variable. As discussed, the first colors may include default colors based, e.g., on default settings, the color and/or other visual characteristics of the initial graphic object, the values of the dataset, etc.

For example, in some embodiments, assigning the first colors includes determining the first colors based on a gradient, wherein the data type is numerical, wherein the gradient includes a first color stop associated with a maximum numerical value and a second color stop associated with a minimum numerical value, and assigning the first colors to the plurality of graphic objects based on the gradient and numerical values associated with each graphic object. Additionally, in some embodiments, assigning the first colors further includes updating the first color stop to be associated with a value larger than the maximum numerical value of the data, and updating the second color stop to be associated with a value smaller than the minimum numerical value of the data. In some embodiments, assigning the first colors further includes associating the gradient with a new color space, and assigning the second colors from the new color space.

In some embodiments, assigning first colors further includes determining a number of categories associated with the data, wherein the data type is categorical, selecting a number of first colors equal to the number of categories, and assigning a different first color to each graphic object associated with a different category.

As illustrated in FIG. 12, the method 1200 also includes an act 1210 of receiving a selection of second colors to be assigned to the plurality of graphic objects. As discussed, in some embodiments, a fill panel and/or color picker may be provided to aid the designer in selecting colors for their data visualization. For example, in some embodiments, the selection of second colors may include displaying a luminosity chart that shows a luminosity value associated with each first color, and replacing one or more first colors with one or more second colors based on luminosity values.

As illustrated in FIG. 12, the method 1200 also includes an act 1212 of updating the chart using the second colors. As discussed, when new colors are selected, a new color binding may be created. This color binding can be provided to an object manager and used to update the colors of the data visualization. For example, in some embodiments, updating the chart includes updating the color binding to define a relationship between color values of the second colors and data values of the variable.

In some embodiments, a method of binding colors to a data visualization includes receiving a dataset, generating a plurality of graphic objects based on the dataset and a visual property of the plurality of graphic objects, determining a scale associated with the dataset, determining a plurality of color stops associated with the data set based on the scale; creating a color binding that identifies at least the dataset and the plurality of color stops, and assigning colors to the plurality of graphic objects using the color binding.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

FIG. 13 illustrates, in block diagram form, an exemplary computing device 1300 that may be configured to perform one or more of the processes described above. One will appreciate that one or more computing devices such as the computing device 1300 may implement the data visualization system. As shown by FIG. 13, the computing device can comprise a processor 1302, memory 1304, one or more communication interfaces 1306, a storage device 1308, and one or more I/O devices/interfaces 1310. In certain embodiments, the computing device 1300 can include fewer or more components than those shown in FIG. 13. Components of computing device 1300 shown in FIG. 13 will now be described in additional detail.

In particular embodiments, processor(s) 1302 includes hardware for executing instructions, such as those making up a computer program. As an example, and not by way of limitation, to execute instructions, processor(s) 1302 may retrieve (or fetch) the instructions from an internal register, an internal cache, memory 1304, or a storage device 1308 and decode and execute them. In various embodiments, the processor(s) 1302 may include one or more central processing units (CPUs), graphics processing units (GPUs), field programmable gate arrays (FPGAs), systems on chip (SoC), or other processor(s) or combinations of processors.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1304 may be internal or distributed memory.

The computing device 1300 can further include one or more communication interfaces 1306. A communication interface 1306 can include hardware, software, or both. The communication interface 1306 can provide one or more interfaces for communication (such as, for example, packet-based communication) between the computing device and one or more other computing devices 1300 or one or more networks. As an example and not by way of limitation, communication interface 1306 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 can comprise hardware, software, or both that couples components of computing device 1300 to each other.

The computing device 1300 includes a storage device 1308 includes storage for storing data or instructions. As an example, and not by way of limitation, storage device 1308 can comprise a non-transitory storage medium described above. The storage device 1308 may include a hard disk drive (HDD), flash memory, a Universal Serial Bus (USB) drive or a combination these or other storage devices. The computing device 1300 also includes one or more input or output ("I/O") devices/interfaces 1310, which are provided to allow a user to provide input to (such as user strokes), receive output from, and otherwise transfer data to and from the computing device 1300. These I/O devices/interfaces 1310 may include a mouse, keypad or a keyboard, a touch screen, camera, optical scanner, network interface, modem, other known I/O devices or a combination of such I/O devices/interfaces 1310. The touch screen may be activated with a stylus or a finger.

The I/O devices/interfaces 1310 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1310 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:

receiving a first data set including data associated with a variable;

generating a first chart, including a first plurality of graphic objects, based on the variable of the first data set and a visual property of the first plurality of graphic objects;

determining a data type associated with the variable;

binning the data based at least on the data type into a plurality of bins;

assigning first colors and a color fill type to the first plurality of graphic objects based on the plurality of bins using a color binding, wherein the color binding associates each bin from the plurality of bins with a different color from the first colors and the color fill type;

generating a second chart, including a second plurality of graphic objects, based on a second data set including second data associated with a second variable;

receiving a first selection of the first chart;

retrieving the color binding associated with the first chart based on the first selection;

applying the color binding associated with the first chart to the second chart to assign the first colors and the color fill type to the second plurality of graphic objects;

receiving a second selection of second colors to be assigned to the first plurality of graphic objects; and updating the first chart using the second colors.

2. The method of claim 1, wherein the color binding defines a relationship between color values of the first colors and data values of the variable.

3. The method of claim 1, wherein assigning the first colors and the color fill type to the first plurality of graphic objects based on the plurality of bins, further comprises:

determining the first colors based on a gradient, wherein the data type is numerical, wherein the gradient includes a first color stop associated with a maximum numerical value and a second color stop associated with a minimum numerical value; and assigning the first colors to the first plurality of graphic objects based on the gradient and numerical values associated with each graphic object.

4. The method of claim 3, further comprising:

updating the first color stop to be associated with a value larger than the maximum numerical value of the data; and updating the second color stop to be associated with a value smaller than the minimum numerical value of the data.

5. The method of claim 3, further comprising:

associating the gradient with a new color space; and assigning the second colors from the new color space.

6. The method of claim 1, wherein assigning first colors to the first plurality of graphic objects based on the plurality of bins, further comprises:

determining a number of categories associated with the data, wherein the data type is categorical, wherein each category is associated with a different bin;

selecting a number of first colors equal to the number of categories; and assigning a different first color to each graphic object associated with a different category.

7. The method of claim 1, further comprising:

displaying a luminosity chart that shows a luminosity value associated with each first color; and replacing one or more first colors with one or more second colors based on luminosity values.

8. The method of claim 1, wherein receiving the second selection of second colors to be assigned to the first plurality of graphic objects, further comprises:

receiving a selection of at least one second color using a color picker.

9. The method of claim 1, wherein updating the first chart using the second colors, further comprises:

updating the color binding to define a relationship between color values of the second colors and data values of the variable.

10. A non-transitory computer-readable medium storing executable instructions, which when executed by a processing device, cause the processing device to perform operations comprising:

receiving a first data set including data associated with a variable;

generating a first chart, including a first plurality of graphic objects, based on the variable of the first data set and a visual property of the first plurality of graphic objects;

determining a data type associated with the variable;

binning the data based at least on the data type into a plurality of bins;

assigning first colors and a color fill type to the first plurality of graphic objects based on the plurality of bins using a color binding, wherein the color binding associates each bin from the plurality of bins with a different color from the first colors and the color fill type;

generating a second chart, including a second plurality of graphic objects, based on a second data set including second data associated with a second variable;

receiving a first selection of the first chart;

retrieving the color binding associated with the first chart based on the first selection;

applying the color binding associated with the first chart to the second chart to assign the first colors and the color fill type to the second plurality of graphic objects;

receiving a second selection of second colors to be assigned to the first plurality of graphic objects; and updating the first chart using the second colors.

11. The non-transitory computer-readable medium of claim 10, wherein the color binding defines a relationship between color values of the first colors and data values of the variable.

12. The non-transitory computer-readable medium of claim 10, wherein the operation of assigning the first colors and the color fill type to the first plurality of graphic objects based on the plurality of bins, further comprises:

determining the first colors based on a gradient, wherein the data type is numerical, wherein the gradient includes a first color stop associated with a maximum numerical value and a second color stop associated with a minimum numerical value; and assigning the first colors to the first plurality of graphic objects based on the gradient and numerical values associated with each graphic object.

13. The non-transitory computer-readable medium of claim 12, wherein the operations further comprise:

updating the first color stop to be associated with a value larger than the maximum numerical value of the data; and updating the second color stop to be associated with a value smaller than the minimum numerical value of the data.

14. The non-transitory computer-readable medium of claim 12, wherein the operations further comprise:

associating the gradient with a new color space; and assigning the second colors from the new color space.

15. The non-transitory computer-readable medium of claim 10, wherein the operation of assigning first colors to the first plurality of graphic objects based on the data type, further comprises:

determining a number of categories associated with the data, wherein the data type is categorical, wherein each category is associated with a different bin;

selecting a number of first colors equal to the number of categories; and assigning a different first color to each graphic object associated with a different category.

16. The non-transitory computer-readable medium of claim 10, wherein the operations further comprise:

displaying a luminosity chart that shows a luminosity value associated with each first color; and replacing one or more first colors with one or more second colors based on luminosity values.

17. The non-transitory computer-readable medium of claim 10, wherein the operation of receiving the second selection of second colors to be assigned to the first plurality of graphic objects, further comprises:

receiving a selection of at least one second color using a color picker.

18. The non-transitory computer-readable medium of claim 10, wherein the operation of updating the first chart using the second colors, further comprises:

updating the color binding to define a relationship between color values of the second colors and data values of the variable.

19. A system comprising:

a memory component; and a processing device coupled to the memory component, the processing device to perform operations comprising:

receiving a first data set;

generating a first plurality of graphic objects based on the first data set and a visual property of the first plurality of graphic objects;

determining a gradient color fill is applicable to the plurality of graphic objects based on a data type of the first data set;

determining a scale associated with the first data set;

determining a plurality of color stops associated with the first data set based on the scale;

creating a color binding that identifies at least the first data set and the plurality of color stops for the gradient color fill;

assigning colors to the plurality of graphic objects using the color binding;

receiving a second data set;

generating a second plurality of graphic objects based on the second data set and a visual property of the second plurality of graphic objects;

receiving a selection of the first plurality of graphic objects;

retrieving the color binding associated with the first plurality of graphic objects based on the selection; and applying the color binding associated with the first plurality of graphic objects to the second data set to assign the plurality of color stops for the gradient color fill to the second plurality of graphic objects.

20. The system of claim 19 wherein the color binding defines a relationship between color values of the colors and data values of the data set.

\* \* \* \* \*